United States Patent
Yamamoto et al.

(10) Patent No.: US 8,288,980 B2
(45) Date of Patent: Oct. 16, 2012

(54) APPARATUS FOR CARRYING OUT IMPROVED CONTROL OF ROTARY MACHINE

(75) Inventors: Tsuyoshi Yamamoto, Okazaki (JP); Takahiro Yamada, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/137,366

(22) Filed: Aug. 9, 2011

(65) Prior Publication Data

US 2011/0298403 A1 Dec. 8, 2011

Related U.S. Application Data

(62) Division of application No. 12/408,009, filed on Mar. 20, 2009, now Pat. No. 8,018,185.

(30) Foreign Application Priority Data

Mar. 21, 2008 (JP) .................................. 2008-072917

(51) Int. Cl.
H02P 7/00 (2006.01)

(52) U.S. Cl. ............... 318/432; 318/400.02; 318/400.26; 318/434

(58) Field of Classification Search ............. 318/400.01, 318/400.02, 400.15, 400.26, 400.27, 432, 318/434, 461, 474
See application file for complete search history.

(56) References Cited

U.S. PATENT DOCUMENTS

| 7,170,256 | B2 | 1/2007 | Iwashita et al. | |
|---|---|---|---|---|
| 7,388,346 | B2 * | 6/2008 | Nishimura et al. | 318/723 |
| 7,548,035 | B2 * | 6/2009 | Endo et al. | 318/432 |
| 7,573,227 | B2 * | 8/2009 | Kasaoka et al. | 318/807 |
| 7,583,048 | B2 * | 9/2009 | Atarashi et al. | 318/807 |
| 7,589,486 | B2 * | 9/2009 | Yamada et al. | 318/432 |
| 7,622,875 | B2 | 11/2009 | Atarashi et al. | |
| 7,723,945 | B2 * | 5/2010 | Okamura | 318/805 |
| 2009/0237021 | A1 | 9/2009 | Yamamoto | |

FOREIGN PATENT DOCUMENTS

| JP | 03-106217 | 5/1991 |
|---|---|---|
| JP | 09-014148 | 1/1997 |
| JP | 09-047100 | 2/1997 |
| JP | 10-243699 | 9/1998 |
| JP | 11-285288 | 10/1999 |
| JP | 11-299297 | 10/1999 |
| JP | 2000-050689 | 2/2000 |
| JP | 2000-245196 | 9/2000 |

OTHER PUBLICATIONS

Japanese Office Action dated Jan. 19, 2010, issued in corresponding Japanese Application No. 2008-072917, with English translation.

* cited by examiner

Primary Examiner — Bentsu Ro
Assistant Examiner — Thai Dinh
(74) Attorney, Agent, or Firm — Nixon & Vanderhye PC

(57) ABSTRACT

In an apparatus, a norm setter sets, based on a request torque for a rotary machine and a rotational velocity of a rotor, a norm of a vector of an output voltage in a two-phase rotating coordinate system defined in the rotor. A phase setter sets, based on a deviation between a generated torque and the request torque, a phase of the vector of the output voltage of the power converter in the two-phase rotating coordinate system. A drive signal determiner determines, based on the norm set by the norm setter and the phase set by the phase setter, a drive signal, and applies the drive signal to a switching member to thereby drive the switching member such that the generated torque is adjusted to the request torque.

18 Claims, 9 Drawing Sheets

BL1: $\dfrac{\partial T(Vn1, \delta, \omega)}{\partial \delta} > 0$    BL2: $id(Vn1, \delta, \omega) \leq 0$ BL3: $iq(Vn1, \delta, \omega) \geq 0$    BL4:    $Vn1 \leq 0.78 \cdot VDC$

FIG. 5

$Td \rightarrow$
$\omega \rightarrow$ $$id = \frac{\Phi}{2(Lq-Ld)} - \sqrt{\frac{\Phi^2}{4(Lq-Ld)^2} + iq^2}$$

$$vd = -Vn1\sin\delta$$
$$vq = Vn1\cos\delta$$
$$Vn1(\delta,\omega) \equiv \sqrt{vd^2 + vq^2}$$
$$T = g(\delta)$$

$\rightarrow Vn1$

TORQUE-VELOCITY NORMALIZED NORM Vn1/ω MAP $T = g(\delta)$
$Vn1 \fallingdotseq \omega \cdot f(\delta) = \omega \cdot f(g^{-1}(T)) \equiv \omega \cdot h(T)(R \fallingdotseq 0)$

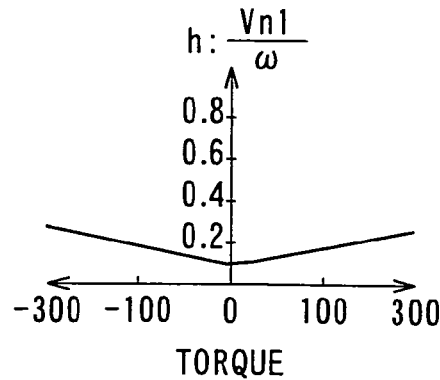

FIG. 6B

| δ | V/ω | T |
|---|-----|---|
| 0 | f(0) | g(0) |
| 0.1 | f(0.1) | g(0.1) |
| 0.2 | f(0.2) | g(0.2) |
| 0.3 | f(0.3) | g(0.3) |
| ⋮ | ⋮ | ⋮ |

APPARATUS FOR CARRYING OUT IMPROVED CONTROL OF ROTARY MACHINE

CROSS REFERENCE TO RELATED APPLICATIONS

This application is a Division of application Ser. No. 12/408,009, filed Mar. 20, 2009, which is based on Japanese Patent Application 2008-72917 filed on Mar. 21, 2008. This application claims the benefit of priority from the Japanese Patent Application, so that the descriptions of which are all incorporated herein by reference.

FIELD OF THE INVENTION

The present invention relates to apparatuses for driving a power converter having a switching element and operative to establish electrical connection between a terminal of a rotary machine and a DC (Direct Current) power supply unit therethrough to thereby adjust an actual torque of the rotary machine to a request torque.

BACKGROUND OF THE INVENTION

A type of such control apparatuses set forth above is designed to carry out current feedback control to thereby adjust an actual torque of a rotary machine to a request torque. A typical control apparatus of this type operates in a PWM (Pulse Width Modulation) control mode for switching elements of an inverter as an example of power converters.

The control apparatus for a three-phase motor operates in the PWM control mode to calculate a substantially sinusoidal command voltage for each phase winding of the three-phase motor; this command voltage is required to match an actual current flowing through each phase winding and fed back therefrom with a desired periodic command current.

The control apparatus operates in the PWM control mode to compare the sinusoidal command voltage for each phase winding with a triangular (or saw-tooth) carrier wave. Based on the result of the comparison, the control apparatus operates in the PWM mode to individually switch on and off each of bridge-configured switching elements of an inverter based on the result of the comparison. This modulates an input DC voltage to the inverter into an AC (Alternating Current) voltage to be applied to each phase winding of the rotary machine.

Adjustment of the on and off durations, that is, the duty (duty cycle) of each of the bridge-configured switching elements by the control apparatus matches the AC voltage to be applied to each phase winding with the command voltage therefor. This matches the actual current flowing through each phase winding to a desired periodic command current. The actual current flowing through each phase winding works to generate a torque corresponding to the desired command current for each phase winding.

The PWM control mode for a three-phase motor needs to increase the command voltage in a higher speed range of the three-phase motor. The bridge-configured inverter limits an upper limit of the amplitude of the command voltage to substantially the half of the input DC voltage to the inverter. This is because the substantial half of the input DC voltage to the inverter is applied to each phase winding.

Thus, when the command voltage increases in amplitude to be greater than the half of the inverter input DC voltage, an actual output voltage of the inverter cannot be matched with the command voltage.

Thus, in a higher speed range of a three-phase motor, using a single-pulse control mode in place of the PWM control mode has been implemented.

A control apparatus operates in the single-pulse control mode in a higher speed range of the three-phase motor to individually switch on and off each of the switching elements of the inverter such that the on and off cycle of each of the switching elements is substantially matched with the period of the periodic command current; this period corresponds to an electric angle of $2\pi$ radians.

The control apparatus that operates in the single-pulse control mode in a higher speed range of the three-phase motor provides a voltage utilization factor greater than that obtained when it operates in the PWM control mode in the higher speed range. The voltage utilization factor means the ratio of a magnitude of an inverter output voltage to the inverter input DC voltage.

However, the single-pulse control mode abruptly, that is, discontinuously increases the voltage utilization factor from the value obtained at the moment when the amplitude of the command voltage for the PWM control mode reaches the half of the input DC voltage to the inverter.

An additional control method for continuously shifting inverter control from the PWM control mode to the single-pulse control mode is disclosed in Japanese Patent Application Publication No. H09-047100.

The method disclosed in the Patent Publication is designed to, when the amplitude of the command voltage for the PWM control mode reaches the half of the inverter input DC voltage, use a pattern of periodic repetitive pulses stored in a ROM and a phase of a vector of the command voltage in a d-q coordinate system. The d-axis of the d-q coordinate system is in line with a rotor N pole center of the three-phase motor, and the q-axis thereof has a phase of $\pi/2$ radian electric angle leading with respect to a corresponding d-axis during rotation of the three-phase motor.

The method is also designed to switch on and off each of the bridge-configured switching elements in accordance with the pattern of periodic repetitive pulses.

This makes possible that the voltage utilization factor obtained at the moment when the amplitude of the command voltage for the PWM control mode substantially reaches the half of the inverter input DC voltage is continuously shifted to the voltage utilization factor obtained using the single pulse control mode.

SUMMARY OF THE INVENTION

The inventors of this application have founded that an increase in the command voltage over the half of the input DC voltage of the inverter may cause the waveform of an actual current flowing through each phase winding to be distorted due to higher order harmonics, resulting in reducing the performance of the current feedback control.

This means that the command voltage vector in the d-q coordinate system may not be properly determined in order to keep high the performance of the current feedback control.

For this reason, the method disclosed in the Patent Publication using the phase of the command voltage vector in the d-q coordinate system may make it difficult to maintain, at a high level, the performance of the current feedback control when the control of the inverter is shifted from the PWM control mode to the single-pulse control mode.

In view of the background, an object of at least one aspect of the present invention is to provide apparatuses for driving a power converter having a switching element and operative to establish electrical connection between a terminal of a rotary machine and a DC power supply unit therethrough to thereby control the rotary machine so that an actual torque of the rotary machine is adjusted to a request torque. These apparatuses have an improved structure to maintain, at a high level, the performance of the control of the rotary machine even if a higher voltage utilization factor is required.

According to one aspect of the present invention, there is provided an apparatus for driving a switching member of a power converter so as to generate, from a DC (Direct Current) voltage of a power supply source, a variable output voltage of the power converter. The output voltage is applied to a rotary machine and generating torque in the rotary machine. The actual generated torque allows a rotor of the rotary machine to rotate. The apparatus includes a norm setter that sets, based on the a request torque for the rotary machine and a rotational velocity of the rotor, a norm of a vector of the output voltage in a two-phase rotating coordinate system defined in the rotor. The apparatus includes a phase setter that sets, based on a deviation between the generated torque and the request torque, a phase of the vector of the output voltage of the power converter in the two-phase rotating coordinate system. The apparatus includes a drive signal determiner that determines, based on the norm set by the norm setter and the phase set by the phase setter, a drive signal, and applies the drive signal to the switching member to thereby drive the switching member such that the generated torque is adjusted to the request torque.

According to another aspect of the present invention, there is provided a control system including the power converter according to the one aspect of the present invention, and the control apparatus according to the one aspect of the present invention.

BRIEF DESCRIPTION OF THE DRAWINGS

Other objects and aspects of the invention will become apparent from the following description of embodiments with reference to the accompanying drawings in which:

FIG. 5 is a block diagram schematically illustrating a functional structure of a norm calculator illustrated in FIG. 2 according to the first embodiment of the present invention;

FIG. 6A is a graph schematically illustrating a function with an independent variable of a torque T and a dependent variable of a ω-normalized norm (Vn1/ω) according to the first embodiment;

FIG. 6B is a view schematically illustrating a map representing the function illustrated in FIG. 6A;

DETAILED DESCRIPTION OF EMBODIMENTS OF THE INVENTION

Embodiments of the present invention will be described hereinafter with reference to the accompanying drawings. In each of the embodiments, the present invention is, for example, applied to a control system for a three-phase motor-generator installed in a hybrid vehicle; this three-phase motor-generator is an example of various types of multiphase rotary machines.

Figure 1:
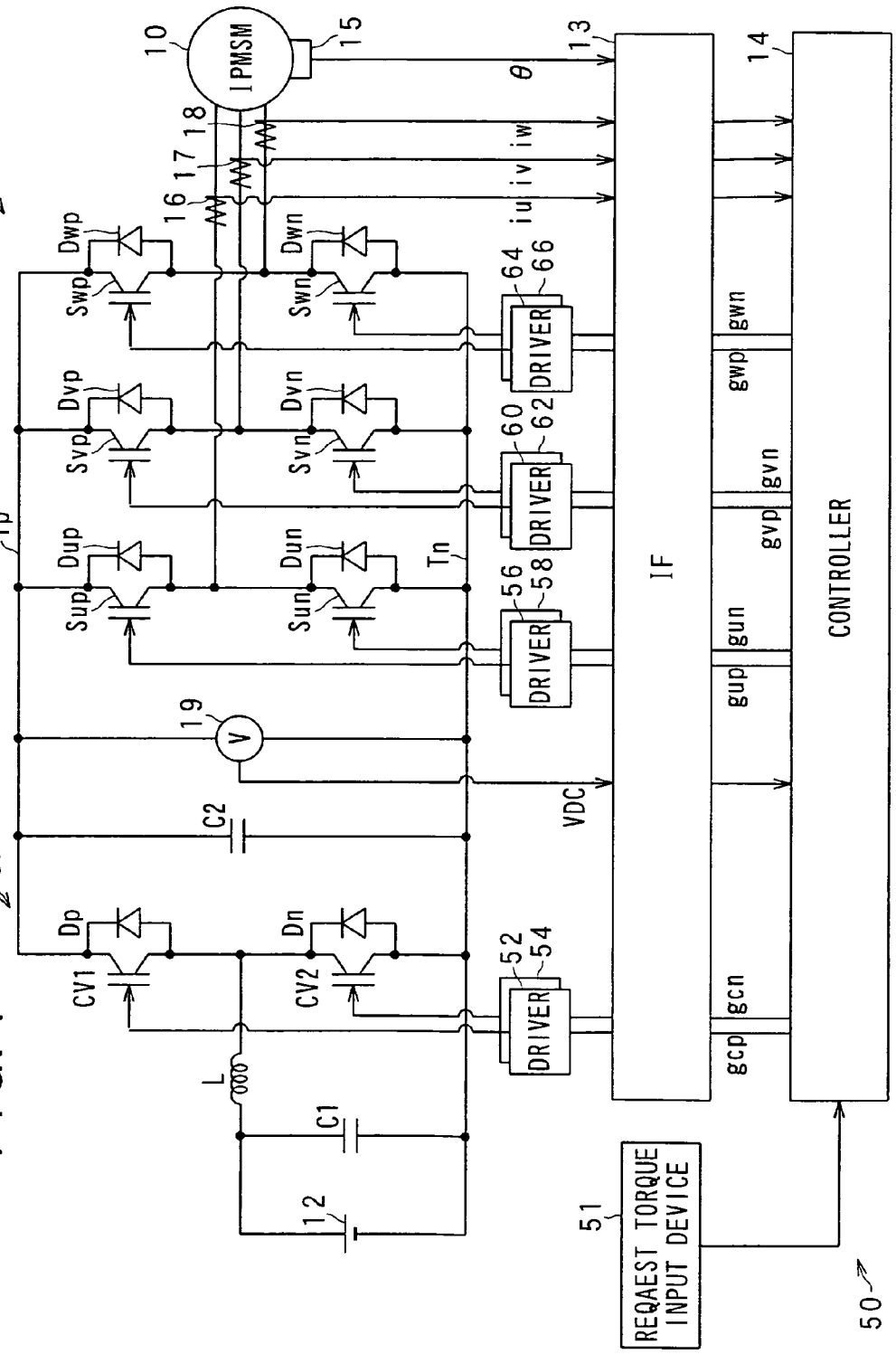
FIG. 1 is a circuit diagram of a control system according to the first embodiment of the present invention.

Referring to the drawings, in which like reference characters refer to like parts in several figures, particularly to FIG. 1, there is illustrated a three-phase motor-generator, referred to simply as "motor-generator (MG)" 10 installed in a hybrid vehicle. In the first embodiment, as the motor-generator 10, a salient-pole motor having a salient-pole structure is used. For example, as the motor-generator 10, an IPMSM (Interior Permanent Magnet Synchronous Motor) is used.

In FIG. 1, there is also illustrated a control system 50. The control system 50 is equipped with an inverter W serving as a power converter, a voltage converter CV, a high-voltage battery 12, an interface 13, a control apparatus 14, and gate drivers 52, 54, 56, 58, 60, 62, 64, and 66.

Specifically, the motor-generator 10 and the high-voltage battery 12 can establish electrical connection therebetween via the inverter IV and the voltage converter CV.

For example, the motor-generator 10 is provided with an annular rotor having an iron rotor core. The iron rotor core is, for example, directly or indirectly coupled to a crankshaft of an engine installed in the hybrid vehicle.

The rotor has a salient-pole structure.

Specifically, the rotor core of the rotor is provided at its circumferential portions with at lest one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian electric angle leading with respect to a corresponding d-axis during rotation of the rotor. The d and q axes constitute a d-q coordinate system (two-phase rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings wound in the slots of the stator.

The three-phase windings are wound in the slots such that the U-, V-, and W-phase windings are shifted by an electric angle of, for example, $2\pi/3$ radian in phase from each other.

One ends of the U-, V-, and W-phase windings are connected to each other in, for example, star configuration to constitute a neutral point.

The motor-generator 10 is operative to receive at its three-phase windings three-phase currents to thereby generate a rotating magnetic flux; this allows the rotor to turn based on magnetic attractive force between the rotating magnetic flux and a magnetic flux of the rotor.

The voltage converter CV includes a coil L, a capacitor C1, a capacitor C2, a pair of series-connected switching elements CV1 and CV2, and a pair of flywheel diodes Dp and Dn.

One electrode of the capacitor C1 is connected to a positive terminal of the high-voltage battery 12, and the other thereof to a negative terminal of the high-voltage battery 12. One end of the coil L is connected to both the positive terminal of the high-voltage battery 12 and the one electrode of the capacitor C1.

In the first embodiment, as the switching elements CV1 and CV2, IGBTs (Insulated Gate Bipolar Transistors) are respectively used. The flywheel diodes Dp and Dn are connected in antiparallel to the switching elements CV1 and CV2, respectively. The other end of the coil L is connected to a point at which the switching elements CV1 and CV2 are electrically connected in series.

When power MOSFETs are used as the pair of switching elements CV1 and CV2, intrinsic diodes of the power MOSFETs can be used as the flywheel diodes, thus eliminating the flywheel diodes.

The capacitor C2 is connected in parallel to the pair of high- and low-side switching elements CV1 and CV2.

The high-voltage battery 12 is designed as a rechargeable battery and has a nominal voltage of, for example, 288 V.

For example, when the control system 50 operates in a power-running control mode, the switching elements CV1 and CV2 of the voltage converter CV are driven on and off. This converts a voltage across the battery 12 into a higher voltage using electromagnetic energy stored in the coil L by the on and off switchings of the switching elements CV1 and CV2. For example, when a voltage across the battery 12, referred to as "battery voltage" is 288 V, the voltage converter CV works to convert the battery voltage of 288 V into 666 V.

In addition, when the control system 50 operates in a regenerative control mode during the hybrid vehicle being decelerated, the motor-generator 10 serves as a generator to thereby convert mechanical power based on the rotation of the motor-generator 10 into electrical power. The electrical power is converted by the inverter IV into DC power. The switching elements CV1 and CV2 of the voltage converter CV are driven on and off. This converts a voltage across the capacitor C2 based on the converted DC power into a lower voltage based on voltage drop across the coil L by the on and off switchings of the switching elements CV1 and CV2. The lower voltage stepped down from the voltage across the capacitor C2 is charged in the battery 12.

The inverter IV is designed as a three-phase inverter. The inverter IV is provided with a first pair of series-connected high- and low-side switching elements Sup and Sun, a second pair of series-connected high- and low-side switching elements Svp and Svn, and a third pair of series-connected high- and low-side switching elements Swp and Swn. The inverter IV is also provided with flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The first to third pairs of switching elements are parallely connected to each other in bridge configuration.

A connecting point through which the switching elements Sup and Sun of the first pair are connected to each other in series is connected to an output lead extending from the other end of the U-phase winding. Similarly, a connecting point through which the switching elements Svp and Svn of the second pair are connected to each other in series is connected to an output lead extending from the other end of the V-phase winding. Moreover, a connecting point through which the switching elements Swp and Swn of the third pair are connected to each other in series is connected to an output lead extending from the other end of the W-phase winding.

One end of the series-connected switching elements of each of the first, second, and third pairs, such as the drain of the corresponding high-side switching element, is connected to the positive terminal of the battery 12 via a positive terminal Tp of the inverter IV, the switching element CV1 and the coil L. The other end of the series-connected switching elements of each of the first, second, and third pairs, such as the source of the corresponding low-side switching element, is connected to the negative terminal of the battery 12 via a negative terminal Tn of the inverter IV.

In other words, the battery 12 is parallely connected to the first, second, and third pairs of upper- and lower-armed switching elements.

The control system 50 is equipped with, as means for detecting operating conditions of each of the motor-generator 10 and the inverter IV, a rotational angle sensor 15, current sensors 16, 17, and 18, and a voltage sensor 19.

The rotational angle sensor 15 is arranged, for example, close to the rotor of the motor-generator 10 and operative to measure an actual rotational angle (electric angle) θ of the d-axis of the rotor with respect to a stator coordinate system fixed in space which characterizes the three-phase windings of the stator. The rotational angle sensor 15 is also operative to measure an actual electric angular velocity (rotational velocity) ω of the d-axis of the rotor. The electric angular velocity ω will be referred to as "angular velocity ω" hereinafter. The rotational angle sensor 15 is communicable with the controller 14 via the interface 13 and operative to send, to the controller 14, the measured actual rotation angle θ and angular velocity ω of the rotor as some of motor-generator state variables.

The current sensor 16 is arranged to allow measurement of an instantaneous U-phase alternating current actually flowing through the U-phase winding of the stator. Similarly, the current sensor 17 is arranged to allow measurement of an instantaneous V-phase alternating current actually flowing through the V-phase winding of the stator. The current sensor 18 is arranged to allow measurement of an instantaneous W-phase alternating current actually flowing through the W-phase winding of the stator.

The current sensors 16, 17, and 18 are communicable with the controller 14 through the interface 13.

Specifically, each of the current sensors 16, 17, and 18 is operative to send, to the controller 14, the instantaneous value of a corresponding one of the U-, V-, and W-phase alternating currents as some of the motor-generator state variables.

The voltage sensor 19 is arranged to allow measurement of an input voltage VDC to be applied to the inverter IV. The voltage sensor 19 is communicable with the controller 14 through the interface 13, and operative to send, to the controller 14, the inverter input voltage VDC to be applied to the inverter IV as one of the motor-generator state variables.

The controller 14 is designed as, for example, a computer circuit consisting essentially of, for example, a CPU, an I/O interface, and a memory unit, and operates on a voltage lower than the battery voltage. Thus, the controller 14 constitutes a low voltage system, and the motor-generator 10, the inverter IV, the converter CV, and the high-voltage battery 12 constitute a high voltage system.

The interface 13 is provided with photo-couplers as examples of insulators. The interface 13 is configured to establish electrical insulation between the low voltage system (the controller 14) and the high voltage system, and to allow communications therebetween.

The controller 14 is communicable with a request torque input device 51 installed in the hybrid vehicle. The request torque input device 51 is operative to input, to the controller 14, a commanded torque (request torque) of a user, such as an acceleration command of the user.

For example, an accelerator position sensor installed in the hybrid vehicle can be used as the request torque input device 51. Specifically, the accelerator position sensor is operative to sense an actual position of an accelerator pedal of the hybrid vehicle operable by the driver and to send, as data representing a request torque of the driver, the sensed actual position of the accelerator pedal to the controller 14. The data representing a variable request torque will be referred to as "request torque data" hereinafter.

The switching elements CV1, CV2, Sup, Sun, Svp, Svn, Swp, and Swn have control terminals, such as the gates, connected to the gate drivers 52, 54, 56, 58, 60, 62, 64, and 66, respectively.

The gate drivers 52, 54, 56, 58, 60, 62, 64, and 66 are communicable with the controller 14 via the interface 13.

The controller 14 is operative to generate:
a drive signal gcp for driving the switching element CV1;
a drive signal gcn for driving the switching element CV2;
a drive signal gup for driving the switching element Sup;
a drive signal gun for driving the switching element Sun;
a drive signal gvp for driving the switching element Svp;
a drive signal gvn for driving the switching element Svn;
a drive signal gwp for driving the switching element Swp; and
a drive signal gwn for driving the switching element Swn.

Each of the drive signals gcp, gcn, gup, gun, gvp, gvn, gwp, and gwn is a pulse signal with a controllable duty cycle (controllable pulse width, or controllable on duration).

Specifically, the controller 14 is operative to cause each of the gate drivers 52, 54, 56, 58, 60, 62, 64, and 66 to apply a corresponding one of the drive signals gcp, gcn, gup, gun, gvp, gvn, gwp, and gwn to a corresponding one of the switching elements Scp, Scn, Sup, Sun, Svp, Svn, Swu, and Swn. This allows a corresponding one of the switching elements Scp, Scn, Sup, Sun, Svp, Svn, Swu, and Swn to be driven on during the pulse width (on-duration) of a corresponding one of the drive signals gcp, gcn, gup, gun, gvp, gvn, gwp, and gwn.

Figure 2:
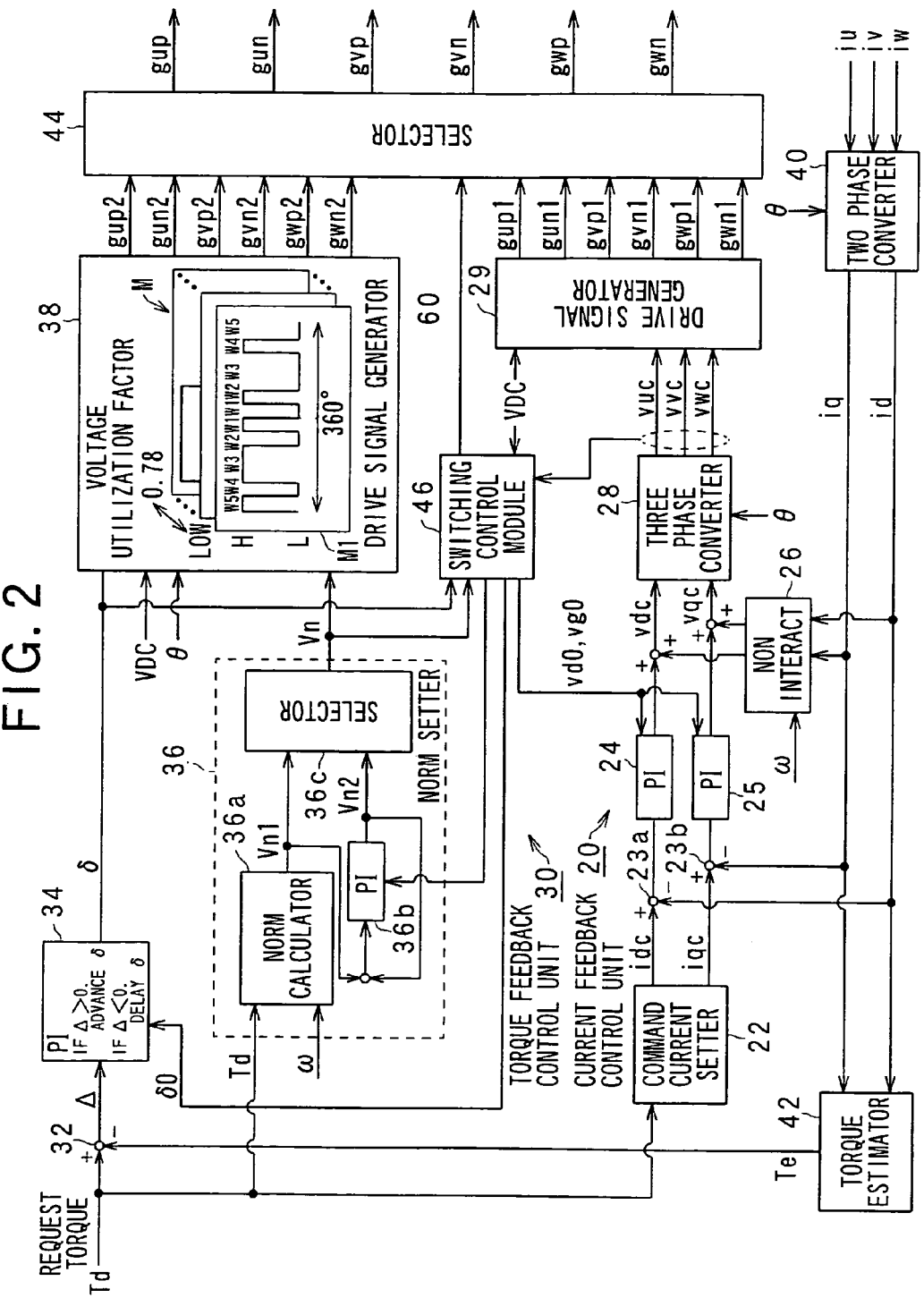
FIG. 2 is a block diagram schematically illustrating functional modules of a controller equivalent to tasks to be executed thereby according to the first embodiment.

FIG. 2 schematically illustrates functional modules of the controller 14 equivalent to tasks to be executed by the controller 14.

As illustrated in FIG. 2, the controller 14 includes a current feedback control unit 20, a torque feedback control unit 30, and a switching control unit 60, these units 20, 30, and 60 are operatively associated with one another.

Next, functional modules included in the current feedback control unit 20, functional modules included in the torque feedback control unit 30, functional modules included in the switching control unit 60, and how to design the torque feedback control unit will be described hereinafter in this order.

Each of or some of the functional modules included in the controller 14 can be designed as a hardwired logic circuit, programmed logic circuit, or hardwired-logic and programmed-logic hybrid circuit.

Current Feedback Control Unit

The current feedback control unit 20 includes a command current setter 22, deviation calculators 23a and 23b, feedback control modules 24 and 25, a non-interacting control module 26, a three-phase converter 28, a drive signal generator 29, and a two-phase converter 40. The cooperative operations of the modules 22, 23a, 23b, 24, 25, 26, 28, 29, and 40 carry out a current-feedback control task described hereinafter.

The two-phase converter 40 has, for example, a map in data-table format and/or program format. The map allows the two-phase converter to calculate cosine functions.

Specifically, the two-phase converter 40 works to receive actual instantaneous U-, V-, and W-phase alternating currents iu, iv, and iw measured by the respective current sensors 16, 17, and 18 and the actual rotation angle θ measured by the rotational angular sensor 15.

The two-phase converter 40 also works to convert the received actual instantaneous U-, V-, and W-phase alternating currents iu, iv, and iw in the stator coordinate system into actual d-axis and q-axis current components id and iq in the d-q coordinate system of the rotor based on the received actual rotational angle θ and the map.

The command current setter 22 works to receive the request torque data inputted from the request torque input device 51. The command current setter 22 works to set command d-axis current components idc and a command q-axis current component iqc in the d-q coordinate system of the rotor based on the request torque data to thereby provide, for example, maximum torque control described hereinafter.

The deviation calculator 23a works to calculate a deviation Δ id between the command d-axis current component idc and the actual d-axis current component id. The deviation calculator 23b works to calculate a deviation Δ iq between the command q-axis current component iqc and the actual q-axis current component iq.

The feedback control module 24 works to set, based on the deviation Δ id, a command voltage vdc' in the d-axis; this command voltage vdc' allows the command d-axis current component idc to be matched with the measured actual d-axis current component id.

The feedback control module 25 works to set, based on the deviation Δ iq, a command voltage vqc' in the q-axis; this command voltage vqc' allows the command q-axis current component iqc to be matched with the measured actual q-axis current component iq.

Specifically, in the first embodiment, each of the feedback control modules 24 and 25 computes a corresponding one of the command voltages vdc' and vqc' using a proportional gain term and an integral gain term of a proportional integral feedback algorithm.

In the proportional integral feedback algorithm, each of the command voltages vdc' and vqc' is expressed based on the proportional gain term and integral gain term.

The proportional gain term for each of the command voltages vdc' and vqc' contributes to change in a corresponding one of the command voltages vdc' and vqc' in proportion to a corresponding one of the temporal deviations Δ id and Δ iq. The integral gain term is proportional to an accumulated offset of instantaneous values of each of the temporal deviations Δ id and Δ iq over time to reset the accumulated offset (steady-state deviation) over time to zero.

The non-interacting control module 26, which is abbreviated as "NON INTERACT" in FIG. 2, works to carry out feedforward correction of the command voltages vdc' and vqc' based on the actual d-axis and q-axis current components id and iq and the actual angular velocity ω of the motor-generator 10.

Specifically, the non-interacting control module 26 calculates a feedforward term based on the actual d-axis and q-axis current components id and iq and the actual angular velocity ω of the motor-generator 10. The feedforward term works to, for example, cancel a d-q axis cross coupling term in each of the command voltages vdc' and vqc'.

Thus, the non-interacting control module 26 corrects the command voltages vdc' and vqc' based on the calculated feedforward term to thereby generate command voltages vdc and vqc in the d-axis and q-axis of the d-q coordinate system, respectively. The command voltages vdc and vqc in the d-axis and q-axis of the d-q coordinate system are passed to the three-phase converter 28.

The three-phase converter 28 has, for example, a map in data-table format and/or program format. The map allows the three-phase converter to calculate cosine functions.

Specifically, the three-phase converter 28 works to convert, based on the actual rotational angle θ and the map, the command voltages vdc and vqc in the d-q axes into a U-phase command voltage Vuc, a V-phase command voltage Vvc, and a W-phase command voltage Vwc for the respective U-, V-, and W-phase windings of the motor-generator 10. The U-, V-, and W-phase command voltages Vuc, Vvc, and Vwc correspond to, for example, substantially sinusoidal waves, respectively.

The drive signal generator 29 works to generate, based on: the U-, V-, and W-phase command voltages Vuc, Vvc, and Vwc, the inverter input voltage VDC, and a triangular (or saw-tooth) carrier wave, first drive signals gup1, gun1, gvp1, gvn1, gwp1, and gwn1. Each of the first drive signals gup1, gun1, gvp1, gvn1, gwp1, and gwn1 is a pulse signal with a controllable duty cycle (controllable pulse width).

Specifically, the drive signal generator 29 works to:

normalize each of the U-, V-, and W-phase command voltages Vuc, Vvc, and Vwc by dividing it by the inverter input voltage VDC; and compare in magnitude the normalized U-, V-, and W-phase command voltages Vuc, Vvc, and Vwc with the triangular carrier wave to thereby generate the first drive signals gup1, gun1, gvp1, gvn1, gwp1, and gwn1.

The generated first drive signals gup1, gun1, gvp1, gvn1, gwp1, and gwn1 are transferred to a selector 44 of the switching control unit 60 described hereinafter.

Torque Feedback Control Unit

The torque feedback control unit 30 includes a torque estimator 42, a deviation calculator 32, a phase setter 34, a norm setter 36, and a drive signal generator 38. The cooperative operations of the modules 42, 32, 34, 36, and 38 carry out a torque-feedback control task described hereinafter.

The torque estimator 42 works to calculate an estimated torque Te to be created by the motor-generator 10 based on the d-axis and q-axis current components id and iq passed from the two-phase converter 40.

The deviation calculator 32 works to calculate a deviation Δ of the request torque Td from the estimated torque Te.

The phase setter 34 works to set, based on the deviation Δ passed from the deviation calculator 32, a phase δ of an output voltage of the inverter IV in the d-q coordinate system.

Specifically, in the first embodiment, the phase setter 34 computes the phase of the inverter output voltage using a proportional gain term and an integral gain term of a proportional integral feedback algorithm.

In the proportional integral feedback algorithm, the phase of the inverter output voltage is expressed based on the proportional gain term and integral gain term.

The proportional gain term contributes to change in the phase of the inverter output voltage in proportion to the deviation Δ. The integral gain term is proportional to an accumulated offset of instantaneous values of the deviation Δ over time to reset the accumulated offset (steady-state deviation) over time to zero.

For example, the phase setter 34 is designed to set the phase δ such that the phase δ advances when the estimated torque Te lacks relative to the request torque Td, and the phase δ lags when the estimated torque Te becomes excessive relative to the request torque Td.

The norm setter 36 works to set a norm Vn of a vector of the inverter output voltage in the d-q coordinate system based on the actual angular velocity ω of the motor-generator 10 and the request torque Td The norm of a vector is defined as the root sum square of components of the vector.

Specifically, the norm setter 36 includes a norm calculator 36a, a proportional integral (PI) control module 36b, and a selector 36c.

The norm calculator 36a calculates a first norm Vn1 of the inverter output voltage based on the actual angular velocity ω, and the request torque Td The PI control module 36b computes a second norm Vn2 of the inverter output voltage using a proportional gain term and an integral gain term of a proportional integral feedback algorithm.

In the proportional integral feedback algorithm, the second norm Vn2 is expressed based on the proportional gain term and integral gain term.

The proportional gain term contributes to change in the second norm Vn2 in proportion to a deviation between the second norm Vn2 and the first norm Vn1. The integral gain term is proportional to an accumulated offset of instantaneous values of the deviation between the second norm Vn2 and the first norm Vn1 over time to reset the accumulated offset (steady-state deviation) over time to zero.

The selector 36c selects, from the first and second norms Vn1 and Vn2, the second norm Vn2 as the norm Vn of the inverter output voltage when an absolute value of the deviation between the second norm Vn2 and the first norm Vn1 is greater than a preset threshold. The selector 36c selects, from the first and second norms Vn1 and Vn2, the first norm Vn1 as the norm Vn of the inverter output voltage when the absolute value of the deviation between the second norm Vn2 and the first norm Vn1 is equal to or lower than the preset threshold.

The drive signal generator 38 works to generate, based on: the phase δ and the norm Vn set by the respective phase setter 34 and norm setter 36, the inverter input voltage VDC, and the actual rotational angle θ, second drive signals gup2, gun2, gvp2, gvn2, gwp2, and gwn2. Each of the second drive signals gup2, gun2, gvp2, gvn2, gwp2, and gwn2 is a pulse signal.

Specifically, the drive signal generator 38 stores therein a plurality of maps M each composed of, for example, a data table or a program. Each of the maps M represents a function (relationship) between:

a drive-signal waveform for a corresponding one pair of the first to third pairs of switching elements per one period (electric angle of 360 degrees) of a corresponding one of the U-, V-, and W-phase command voltages Vuc, Vvc, and Vwc; and each of a plurality of prepared values of the voltage utilization factor that the inverter IV can provide.

For example, referring to FIG. 2, a map M1 included in the maps M represents a relationship between a drive-signal waveform for the first pair of switching elements Sup and Sun per one period (electric angle of 2π radians) of the U-phase command voltage Vuc and one of the plurality of prepared voltage utilization factors. One pair of the high- and low-side switching pairs will be referred to simply as "one switch pair", and each pair thereof to "each switch pair" hereinafter. The first pair of switching elements Sup and Sun will be referred to as "first switch pair" hereinafter.

Referring to FIG. 2, a maximum level "H" of the drive-signal waveform for the first switch pair represents the on state of the high-side switching element Sup and the off state of the low-side switching element Sun. A base level "L" thereof represents the on state of the low-side switching element Sun and the off state of the high-side switching element Sup.

As typically illustrated by the drive-signal waveform for the first switch pair (Sup and Sun), in each of the plurality of maps M, the total of the on-durations for a corresponding high-side switching element is identical to that for a corresponding low-side switching element. This drive-signal waveform design for each switch pair allows the inverter output voltage to be positively and negatively balanced per a corresponding one period of an electric angle.

In addition, in each of the plurality of maps M, the drive-signal waveform for each switch pair has an inverse symmetry about a point of the half period corresponding to an electric angle of π radians (180 degrees).

For example, in the map M1, on and off durations for the first switch pair (Sup and Sun) are alternatively arranged as W1, W2, W3, W4, and W5 when viewed from the point of the half period to a phase-lower side. Similarly, in the map M1, on and off durations for the first switch pair (Sup and Sun) are alternatively arranged as W1, W2, W3, W4, and W5 when viewed from the point of the half period to a phase-higher side. This waveform design allows the inverter output voltage to approximate with a sinusoidal voltage as much as possible.

Specifically, the drive signal generator 38 calculates the ratio of a variable of the norm Vn (magnitude) of the vector of the inverter output voltage to a variable of the inverter input voltage VDC as a value of the voltage utilization factor.

Based on the calculated value of the voltage utilization factor, the drive signal generator 38 selects one map for each switch pair from the plurality of maps M; this selected map corresponds to the calculated value of the voltage utilization factor.

The upper limit of the plurality of prepared values of the voltage utilization factor is for example set to be substantially 0.78. The voltage utilization factor of substantially 0.78 is known to be a maximum value when the controller 14 operates to control the inverter IV in the single-pulse control mode set forth above.

For this reason, when the calculated value of the voltage utilizing factor is 0.78, the drive signal generator 38 selects one map for each switch pair from the plurality of maps M; this selected map corresponds to the calculated value 0.78 of the voltage utilization factor for a corresponding one switch pair.

The drive-signal waveform of the one selected map for each switch pair is configured such that on and off cycle of a corresponding one switch pair is matched with the period of a corresponding phase command voltage.

After completion of the one-map selection for each switch pair, the drive signal generator 38 works to set an output timing of the drive-signal waveform included in the one selected map for each switch pair based on the phase δ passed from the phase setter 34.

Then, the drive signal generator 38 works to:

determine a pair of drive signals for each switch pair; this pair of drive signals has a corresponding one of the drive-signal waveforms included in the selected one map for each switch pair; and output, as each pair of the second drive signals gup2 and gun2, gvp2 and gvn2, and gwp2 and gwn2, the pair of drive signals for each switch pair to the selector 44 at a corresponding one output timing set thereby.

Switching Control Unit

The switching control unit 60 includes a switching control module 46 and a selector 44.

The switching control module 46 works to carry out switching between a current-feedback control mode in which the current feedback control unit 20 carries out the current-feedback control task set forth above and a torque-feedback control mode in which the torque feedback control unit 30 carries out the torque-feedback control task set forth above.

The selector 44 works to select any one of:

the first group of the first drive signals gup1, gun1, gvp1, gvn1, gwp1, and gwn1; and the second group of the second drive signals gup2, gun2, gvp2, gvn2, gwp2, and gwn2 according to a switching instruction passed from the switching control module 46.

Figure 3:
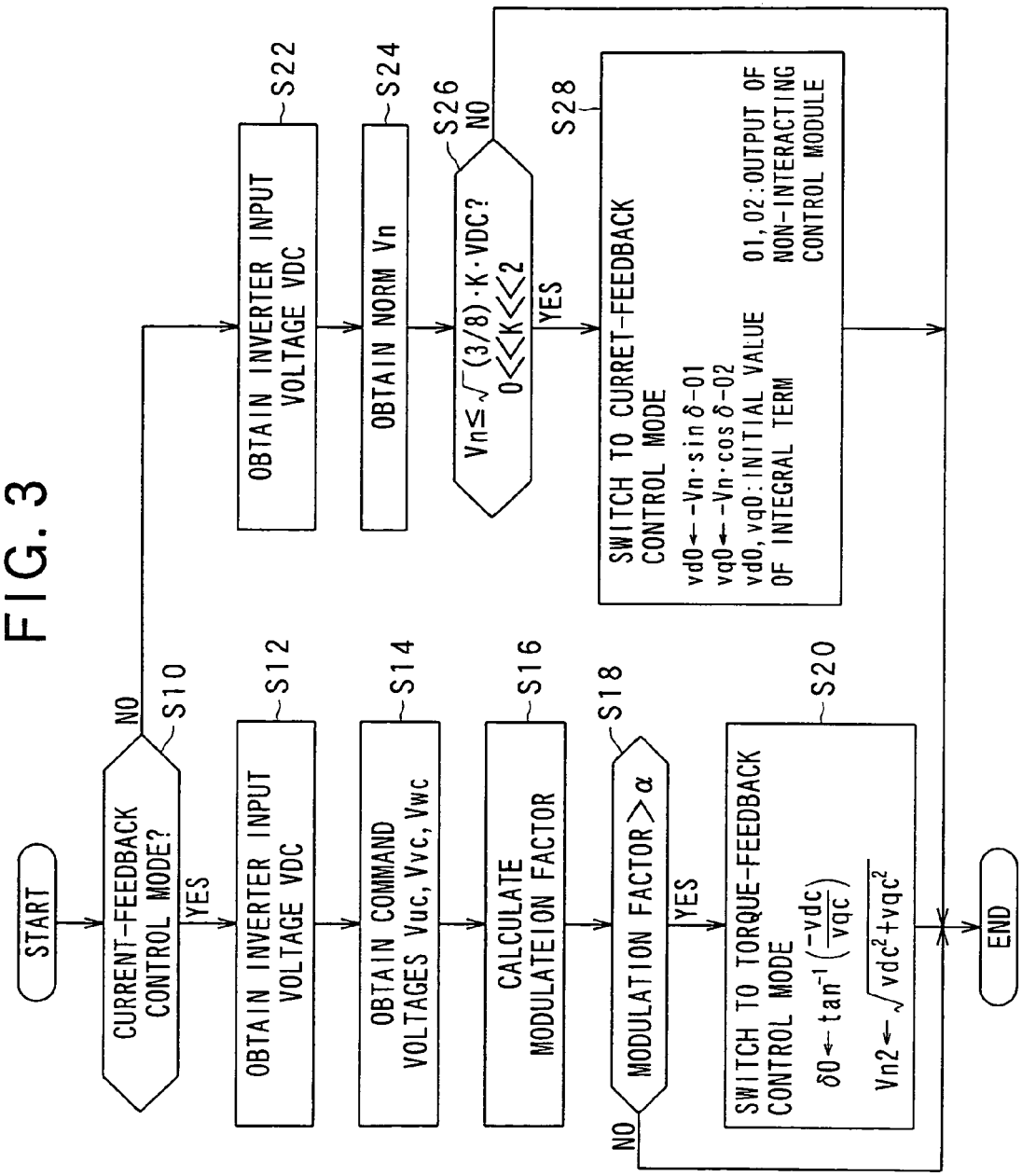
FIG. 3 is a flowchart schematically illustrating a routine to be executed by the controller according to the first embodiment.

A routine to be executed by the switching control module 46 will be described hereinafter with reference to FIG. 3. The routine is, for example, programmed in the controller 14 to be repeatedly executed thereby at a preset cycle.

Starting the routine, the switching control module 46 determines whether the inverter IV is controlled in the current-feedback control mode so that the first drive signals gup1, gun1, gvp1, gvn1, gwp1, and gwn1 are selected to be outputted to the respective drivers 56, 58, 60, 62, 64, and 66 by the selector 44 in step S10.

Upon determining that the inverter IV is controlled in the current-feedback control mode (YES in step S10), the switching control module 46 obtains the inverter input voltage VDC in step S12, and obtains the U-, V-, and W-phase command voltages Vuc, Vvc, and Vwc from the three-phase converter 28 in step S14.

Next, the switching control module 46 calculates a modulation factor based on the obtained inverter input voltage VDC and U-, V-, and W-phase command voltages Vuc, Vvc, and Vwc in step S16. Note that the modulation factor is defined as a ratio of an amplitude of each of the U-, V-, and W-phase command voltages Vuc, Vvc, and Vwc to the half of the inverter input voltage VDC.

Subsequently, the switching control module 46 determines whether the calculated modulation factor is greater than a preset threshold α in step S18. The determination in step S18 is to determine whether the control mode for the inverter IV is switched from the current-feedback control mode to the torque-feedback control mode. In the first embodiment, the threshold α is preset to "1".

Specifically, when the modulation factor exceeds the threshold α, that is, the amplitude of each of the command voltages Vuc, Vvc, and Vwc exceeds the half of the inverter input voltage VDC (the determination in step S18 is YES), the switching control module 46 determines that:

an actual output voltage of the inverter IV for each phase may be not matched with a corresponding one of the command voltages Vuc, Vvc, and Vwc.

Thus, the switching control module 46 would determine, if the current-feedback control mode were continued during the modulation factor exceeding the threshold α, that the performance of the control of the motor-generator 10 may be reduced.

Note that the threshold α can be preset to a value greater than "1", such as "1.15". Specifically, even if the modulation factor exceeds "1", the well-known overmodulation vector control for controlling the inverter W with the modulation factor remaining within an overmodulation control range from "1" to the threshold α allows the performance of the current-feedback control for the inverter IV to be kept high. Thus, when a functional module of the well-known overmodulation control is installed in the controller 14, it is possible to set the threshold to substantially "1.15".

In step S20, the switching control module 46 switches the control mode for the inverter IV from the current-feedback control mode to the torque-feedback control mode.

Specifically, in step S20, the switching control module 46 resets the phase δ to an initial value δ 0; this initial value δ 0 is determined in the following equation:

$$\delta 0 = \tan^{-1}\left(\frac{-Vdc}{Vqc}\right)$$

In step S20, the switching control module 46 resets the second norm Vn2 to be calculated by the PI control module 36b to an initial value Vn2(0); this initial value Vn2(0) is determined in the following equation:

$$Vn2(0) = \sqrt{vdc^2 + vqc^2}$$

Specifically, the initial value Vn2(0) is set to an initial value of the integral gain term of the second norm Vn2.

This allows the norm setter 36 to set the initial value Vn2(0) as an initial value of the norm Vn.

Thereafter, the norm selector 36 gradually changes the norm Vn from the initial value Vn2(0) toward the first norm Vn1. This prevents the norm Vn from being suddenly changed even if the norm based on the command voltages vdc and vqc set by the current-feedback control unit 20 is deviated from the first norm Vn1; this first norm Vn1 is calculated by the norm calculator 36a when the control of the inverter IV is switched from the current-feedback control mode to the torque-feedback control mode.

In step S20, the switching control module 46 passes, to the selector 44, the switching instruction to select the second group of the second drive signals gup2, gun2, gvp2, gvn2, gwp2, and gwn2.

According to the switching instruction, the selector 44 selects the second drive signals gup2, gun2, gvp2, gvn2, gwp2, and gwn2 as the drive signals gup, gun, gvp, gvn, gwp, and gwn, and sends the drive signals gup, gun, gvp, gvn, gwp, and gwn to the drivers 56, 58, 60, 62, 64, and 66, respectively.

Otherwise, in step S10, upon determining that the inverter IV is controlled in the torque-feedback control mode (NO in step S10), the switching control module 46 determines that the second drive signals gup2, gun2, gvp2, gvn2, gwp2, and gwn2 outputted from the torque-feedback control unit 30 drive the inverter IV. Then, in step S22, the switching control module 46 obtains the inverter input voltage VDC, and obtains the norm Vn set by the norm setter 36 in step S24.

Next, in step S26, the switching control module 46 determines whether the obtained norm Vn is equal to or lower than the product of: the square root of "3/8", a coefficient K, and the inverter input voltage VDC. The operation in step S26 is to determine whether the control mode for the inverter IV is switched from the torque-feedback control mode to the current-feedback control mode.

Specifically, when the modulation factor is set to "1", the amplitude (peak value) of each of the command voltages Vuc, Vvc, and Vwc is set to "VDC/2". This means an RMS value of each of the command voltages Vuc, Vvc, and Vwc is equal to "(VDC/2)·(1/√2)". An RMS value of an output voltage of the inverter IV corresponding to a line-to-line command voltage between adjacent any two phases is the product of √3 and one-phase command voltage; this product is equal to "(VDC/2)·(1/√2)·√3" equal to "VDC·√3/8". Thus, when the norm Vn is equal to the product of the battery voltage VDC and the square root of "3/8", the modulation factor is set to "1".

Note that the coefficient K works to minutely shift, from "1", the modulation factor at the moment when the control mode for the inverter IV is switched from the torque-feedback control mode to the current-feedback control mode. The coefficient K is set so as to prevent hunting due to the shift between the current-feedback control mode and the torque-feedback control mode. For example, the coefficient K is set to be much greater than 0, and much less than 2.

Upon determining that the obtained norm Vn is equal to or lower than the product of: the square root of "3/8", the coefficient K, and the inverter input voltage VDC (YES in step S26), the switching control module 46 switches the control mode for the inverter IV from the torque-feedback control mode to the current-feedback control mode in step S28.

Specifically, in step S28, the switching control module 46 sets initial values of the command voltages vdc and vqc for the current-feedback control unit 20 to the vector of the inverter output voltage set by the torque-feedback control unit 30.

In other words, in step S28, the switching control module 46 sets initial values (vd0, vq0) of the command voltages vdc and vqc for the current-feedback control unit 20 to components of a vector (−Vn·sin δ, Vn·cos δ) in the d-q coordinate system. More specifically, the switching control module 46 sets, to an initial value of the integral gain term of each of the feedback control modules 24 and 25, the subtraction of the output of the non-interacting control module 26 from each of the components of the vector (−Vn·sin δ, Vn·cos δ) in the d-q coordinate system.

In step S20, the switching control module 46 passes, to the selector 44, the switching instruction to select the first group of the first drive signals gup1, gun1, gvp1, gvn1, gwp1, and gwn1.

According to the switching instruction, the selector 44 selects the first drive signals gup1, gun1, gvp1, gvn1, gwp1, and gwn1 as the drive signals gup, gun, gvp, gvn, gwp, and gwn, and sends the drive signals gup, gun, gvp, gvn, gwp, and gwn to the drivers 56, 58, 60, 62, 64, and 66, respectively.

When the operation in either step S20 or S28 is completed, the switching control module 46 terminates the routine. Similarly, when negative determination is made in either step S18 or S26, the switching control module 46 terminates the routine.

Each of the drivers 56, 58, 60, 62, 64, and 66 applies a corresponding one of the drive signals gup, gun, gvp, gvn, gwp, and gwn to the gate of a corresponding one of the switching elements Sup, Sun, Svp, Svn, Swu, and Swn. This allows each of the switching elements Sup, Sun, Svp, Svn, Swu, and Swn to be driven on during the pulse width (on-duration) of a corresponding one of the drive signals gup, gun, gvp, gvn, gwp, and gwn.

How to Design the Torque Feedback Control Unit

Referring to FIG. 2, the torque-feedback control unit 30 is configured to set the norm Vn based on the angular velocity ω of the motor-generator 10 and the request torque Td independently of the U- and q-phase command voltages. Thus, the torque-feedback control unit 30 relatively freely sets the norm Vn.

For this reason, control of the request torque Td to reduce the norm Vn as low as possible allows control of the voltage utilization factor. This permits the drive signal generator 38 to select one map for each switch pair from the plurality of maps M; the drive-signal waveform of the selected one map for each switch pair has a large number of pulses. This allows the output voltage of the inverter IV to more approach with a sinusoidal voltage to thereby reduce harmonic distortion in the inverter output voltage. This makes it possible to reduce harmonic currents.

Next, how to determine the first norm Vn1 by the norm calculator 36a will be described hereinafter.

Figure 4A:
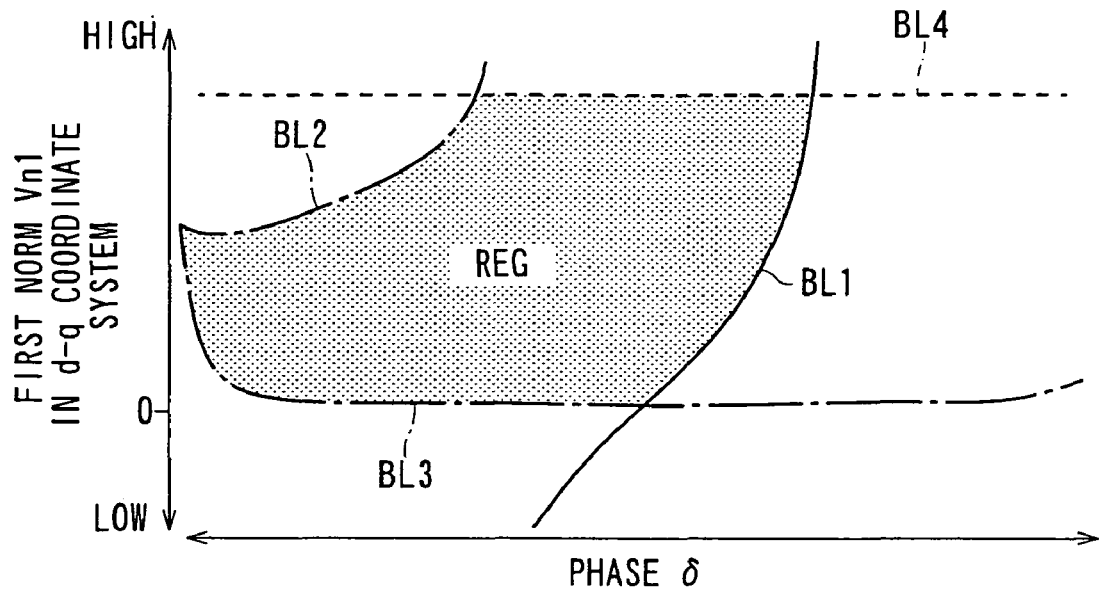
FIG. 4A is a view schematically illustrating basic constrains on a first norm during the control system operating in a power-running control mode according to the first embodiment.

FIG. 4A schematically illustrates basic constrains on the first norm Vn1 during the control system 50 operating in the power-running control mode. Referring to FIG. 4A, the first norm Vn1 is allowed to be set within a region REG enclosed with four border lines BL1, BL2, BL3, and BL4.

The boarder line BL4 represents an upper limit of the first norm Vn1; this upper limit represents the voltage utilization factor of 0.78 that is the maximum value when the controller 14 operates to control the inverter IV in the single-pulse control mode.

Next, how to derive equations representing a torque T to be created by the motor-generator 10 and the current vector (id, iq) in the d-q coordinate system as a function of the first norm Vn1, the phase δ, and the angular velocity ω will be described hereinafter prior to deriving the constrains by the boarder lines BL1, BL2, and BL3.

Figure 4B:
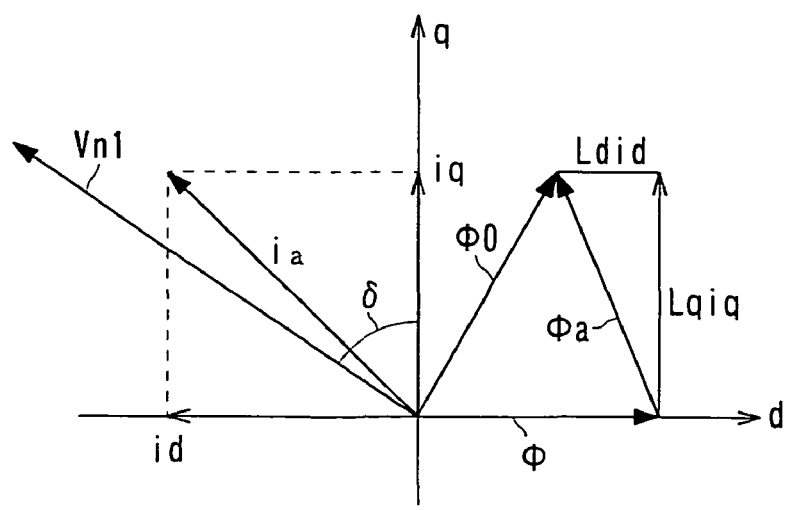
FIG. 4B is a vector diagram schematically illustrating the first norm in a d-q coordinate system according to the first embodiment.

The torque T to be created by the motor-generator 10 is obtained as a vector product of the current vector is (id, iq) and a total flux linkage vector φ0 (see FIG. 4B). The total flux linkage vector φ0 consists of a magnet flux linkage vector φ to an armature winding and a rotating-field flux linkage vector φa thereto.

Specifically, the torque T to be created by the motor-generator 10 is represented by the following equation (c1) using the magnet flux linkage vector φ, the q-axis inductance Lq, the d-axis inductance Ld, an armature resistance R, and the number P of pole pair of the rotor (see FIG. 4B):

$$T = P\{\Phi \cdot iq + (Ld - Lq) \cdot id \cdot iq\} \quad [c1]$$

In addition, a voltage equation is represented by the following equation:

$$\begin{bmatrix} vd \\ vq \end{bmatrix} = \begin{bmatrix} R & -\omega \cdot Lq \\ \omega \cdot Ld & R \end{bmatrix} \begin{bmatrix} id \\ iq \end{bmatrix} + \begin{bmatrix} 0 \\ \omega \cdot \Phi \end{bmatrix} \quad [c2]$$

From the equation [c2] following equation [c3] is derived:

$$\begin{bmatrix} id \\ iq \end{bmatrix} = \frac{1}{R^2 + \omega^2 \cdot Ld \cdot Lq} \begin{bmatrix} R & \omega \cdot Lq \\ \omega \cdot Ld & R \end{bmatrix} \begin{bmatrix} vd \\ vq - \omega \cdot \Phi \end{bmatrix} \quad [c3]$$

Substitution of the equation (c3) into the equation (c1) yields the following equation (c4):

$$T(Vn1, \delta) = \frac{P\sqrt{R^2 + \omega^2 \cdot Ld^2}}{(R^2 + \omega^2 \cdot Ld \cdot Lq)^2} \quad [c4]$$

$$\{Vn1\sin(\delta + \theta1) - \omega\Phi\sin\theta1\} \cdot \left[\Phi(R^2 + \omega^2 \cdot Ld \cdot Lq) + (Ld - Lq)\sqrt{R^2 + \omega^2 Lq^2} \{Vn1\cos(\delta + \theta2) - \omega\Phi\cos\theta2\}\right]$$

where:

$$Vd \equiv -Vn1\sin\delta$$

$$Vq \equiv Vn1\cos\delta$$

$$\sin\theta1 \equiv \frac{R}{\sqrt{R^2 + \omega^2 \cdot Ld^2}}$$

$$\cos\theta1 \equiv \frac{\omega Ld}{\sqrt{R^2 + \omega^2 \cdot Ld^2}}$$

$$\sin\theta2 \equiv \frac{R}{\sqrt{R^2 + \omega^2 \cdot Lq^2}}$$

$$\cos\theta2V \equiv \frac{\omega Lq}{\sqrt{R^2 + \omega^2 \cdot Lq^2}}$$

Note that the boarder line BL1 represents a condition that a partial differential of the torque T with respect to the phase δ becomes positive. The condition of the boarder line BL1 is expressed by the following equations [c5a] and [c5b] based on the equation [c4]:

If $0 \leq \delta \leq \frac{1}{2}(\frac{\pi}{2} - \theta1 - \theta2)$ [c5a]

$$Vn1 < \frac{\Phi(R^2 + \omega^2 \cdot Ld \cdot Lq)\cos(\delta + \theta1) + \omega\Phi(Ld - Lq)}{\sqrt{R^2 + \omega^2 Lq^2} \{\sin\theta1\sin(\delta + \theta2) - \cos\theta2\cos(\delta + \theta1)\}}$$
$$\frac{}{(Ld - Lq)\sqrt{R^2 + \omega^2 \cdot Lq^2} \cos(2\delta + \theta1 + \theta2)}$$

If $\frac{1}{2}(\frac{\pi}{2} - \theta1 - \theta2) < \delta \leq \frac{1}{2}(\frac{3\pi}{2} - \theta1 - \theta2)$ [c5b]

$$Vn1 > \frac{\Phi(R^2 + \omega^2 \cdot Ld \cdot Lq)\cos(\delta + \theta1) + \omega\Phi(Ld - Lq)}{\sqrt{R^2 + \omega^2 Lq^2} \{\sin\theta1\sin(\delta + \theta2) - \cos\theta2\cos(\delta + \theta1)\}}$$
$$\frac{}{(Ld - Lq)\sqrt{R^2 + \omega^2 \cdot Lq^2} \cos(2\delta + \theta1 + \theta2)}$$

The condition represented by the boarder line BL1 allows:

the phase δ to advance when the estimated toque Te lacks relative to the request torque Td, thus compensating the lack of the estimated torque Te; and the phase δ to lag when the estimated torque Te becomes excessive relative to the request torque Td, thus reducing the excessive amount of the estimated torque Te.

Note that, in the first embodiment, the phase δ is limited in the following equation "0≦δ<π/2" when the control system 50 operates in the power-running control mode. In addition, the phase δ is limited in the following equation "π/2<δ≦3π/2" when the control system 50 operates in the regenerative control mode.

For these reasons, the condition that the phase δ is equal to or greater than 3π/2 is deleted.

The boarder line BL2 represents a condition that the d-axis current is equal to or lower than zero. The condition of the boarder line BL2 is expressed by the following equations [c5a] and [c5b] based on the equation [c6a] and [c6b]:

$$\text{If } 0 \le \delta \le \left(\frac{\pi}{2} - \theta 2\right) \quad [c6a]$$

$$Vn1 \le \frac{\omega^2 Lq\Phi}{\sqrt{R^2 + \omega^2 \cdot Lq^2} \cos(\delta + \theta 2)}$$

$$\text{If } \left(\frac{\pi}{2} - \theta 2\right) < \delta \le \pi \quad [c6b]$$

$$Vn1 \ge 0$$

The boarder line BL3 represents a condition that the q-axis current is equal to or greater than zero in the power-running control mode. The condition of the boarder line BL3 is expressed by the following equation [c7]:

$$Vn1 \ge \frac{\omega R\Phi}{\sqrt{R^2 + \omega^2 \cdot Ld^2} \cos(\delta + \theta 1)} \quad [c7]$$

where $0 \le \delta < \pi - \theta 1$

Note that, in the regenerative control mode, the condition that the q-axis current is equal to or lower than zero is imposed on the first norm Vn1.

In the first embodiment, the first norm Vn1 is set within the allowable range REG illustrated in FIG. 4A. Even if each of the phase δ and the angular velocity ω is set, the first norm Vn1 is not uniquely determined. For this reason, the first norm Vn1 can be freely designed within the allowable range REG. In order to reduce harmonic distortion in the inverter output voltage, it is desired to reduce the first norm Vn1 as low as possible. In order to minimize the first norm Vn1, a condition that a partial differential of the torque T with respect to the first norm Vn1 becomes zero need be imposed on the first norm Vn1.

However, the inventors have found that the design model of the first norm Vn1 described hereinbefore makes difficult that the phase δ and the first norm Vn1 have one-to-one correspondence with each other.

Thus, in the first embodiment, the norm calculator 36a is configured to set the first norm Vn1 that allows the controller 14 to carry out maximum torque control that adjusts a phase of the current vector (id, iq) to thereby achieve a maximum torque of the motor-generator 10 at any value of an armature current flowing an armature winding of the motor-generator 10a. This can reduce the first norm Vn1 as low as possible when the request torque Td is achieved.

FIG. 5 schematically illustrates a specific condition to be imposed on the first norm Vn1 by the norm calculator 36a. Referring to FIG. 5, the condition represented by the following equation [c8] is imposed on the first norm Vn1 so as to carry out the maximum torque control. Note that the maximum torque control is designed to always achieve a maximum torque at a same value of the armature current, in other words, most efficiently achieve a torque of the motor-generator 10 at any value of the armature current.

The maximum torque means a positive maximum torque to be created by the motor-generator 10 in the power-running control mode, and means a negative torque whose absolute value is maximum to be created by the motor-generator 10 in the regenerative control mode.

$$id = \frac{\Phi}{2(Lq - Ld)} - \sqrt{\frac{\Phi^2}{4(Lq - Ld)^2} + iq^2} \quad [c8]$$

This equation [c8] is disclosed on page 23 of "Design and Control of Interior Permanent Magnet Synchronous motor" published by Ohmsha, Ltd.

Elimination of the current vector (id, iq) from the equation [c8] based on the equation [c3] represents the first norm Vn1 as a function of each of the angular velocity ω and the phase δ. Particularly, because the torque-feedback control starting condition that the calculated modulation factor is greater than the preset threshold α is established in a higher speed range of the motor-generator 10 (see step S18), the armature resistance R is negligible compared with the impedance based on each of the d-axis and q-axis inductances Ld and Lq proportional to the angular velocity ω.

Thus, the first norm Vn1 is represented by the following equation [c9]:

$$Vn1 = \omega\Phi \cdot \frac{(2Lq - Ld)\cos\delta - \sqrt{\frac{4Ld^2(Lq - Ld)}{Lq}\sin^2\delta + Ld^2\cos^2\delta}}{2(Lq - Ld)\left\{\cos^2\delta - \frac{Ld^2}{Lq^2}\sin^2\delta\right\}} \quad [c9]$$

In the equation [c9], the first norm Vn1 is represented as a function of the phase δ and the angular velocity ω. Based on the equation [c9], the first norm Vn1 is represented as a function of the request torque Td and the angular velocity ω.

Specifically, approximation of the armature resistance R to be small in the equation [c4] establishes the following equation [c10]:

$$T = \frac{P}{LdLq} \cdot \frac{Vn1}{\omega} \cdot \sin\delta\left\{(Ld - Lq) \cdot \frac{Vn1}{\omega} \cdot \cos\delta + Lq\Phi\right\} \quad [c10]$$

$$= \frac{P}{LdLq} \cdot f(\delta) \cdot \sin\{(Ld - Lq) \cdot f(\delta) \cdot \cos\delta + Lq\Phi\}$$

$$= g(\delta)$$

where $f(\delta) \equiv \frac{Vn1}{\omega}$

The function $f(\delta)$ in the equation [c10] has the phase δ as an independent variable and the first norm Vn1 normalized by the angular velocity ω as a independent variable. Note that the reason why the first norm Vn1 can be defined as the product of the angular velocity ω and the function $f(\delta)$ independent of the angular velocity ω is based on the equation [c9]. In other words, the reason is based on the fact that the armature resistance R can be approximated to be negligible (the armature resistance R is approximately equal to zero, represented by "R≈0".

The equation [c10] defines the function $g(\delta)$ that has the phase δ as an independent variable and the torque T as an independent variable. Thus, using an inverse function of the function $g(\delta)$ allows the independent variable in the equation [c10] to be converted from the phase δ into the toque T in accordance with the following equation:

$$Vn1 \approx \omega \cdot f(g^{-1}(T)) = \omega \cdot h(T)$$

where R≈0

This defines a function h with the independent variable of the torque T and the dependent variable of the ω-normalized norm (Vn1/ω).

FIG. 6A schematically illustrates a graph of the function h. Note that the function h need not be analytically obtained. That is, referring to FIG. 6B, the graph of the function h is obtained by:

calculating the function $f$ representing a relationship between a variable of the phase δ and the ω-normalized norm; and calculating the function g representing a relationship between a variable of the phase δ and the torque T.

This allows the relationship between a variable of the request torque Td and the first norm Vn1 to be mapped beforehand in, for example, a table format or a program format on condition that the first norm Vn1 is within the allowable range REG illustrated in FIG. 4A. The map representing the relationship between a variable of the request torque Td and the first norm Vn1 is stored beforehand in the norm calculator 36a.

Therefore, setting of the first norm Vn1 in accordance with the equation [c10] and each of the request torque Td and the angular velocity ω drives the motor-generator 10 by a minimum armature current required to provide the request torque Td.

Note that, in the first embodiment, "map" means a function in which one output is defined when any one of discrete inputs is inputted in the function.

As described above, the control system 50 according to the first embodiment is equipped with the norm setter 36, the phase setter 34, and the drive signal generator 38.

The norm setter 36 is designed to set the norm Vn of the vector of the inverter output voltage in the d-q coordinate system based on the request torque Td and the angular velocity ω of the motor-generator 10.

The phase setter 34 is designed to set, based on the deviation Δ of the request torque Td from the estimated torque Te, the phase δ of the vector of the inverter output voltage in the d-q coordinate system.

The drive signal generator 38 is designed to generate the second drive signals gup2, gun2, gvp2, gvn2, gwp2, and gwn2 that meets the norm Vn and the phase δ of the inverter output voltage.

With the structure of the control system 50, the norm Vn is freely designed based on the phase δ and the angular velocity ω independently of the d- and q-axis command voltages vdc and vqc. This achieves the first advantage of increasing the design flexibility of the waveform of each of the second drive signals gup2, gun2, gvp2, gvn2, gwp2, and gwn2, making it possible to maintain, at a high level, the performance of the control of the motor-generator 10.

In addition, in the first embodiment, the first norm Vn1 serves as a feedforward manipulated variable designed to compensate a gap between a target value for torque control and actual value. If the first norm Vn1 includes an error, the phase δ serves as a feedback manipulated variable to thereby compensate the error included in the first norm Vn1.

The control system 50 is configured to determine the waveform of each of the second drive signals gup2, gun2, gvp2, gvn2, gwp2, and gwn2 such that:

the total of on durations for the high-side switching element of a corresponding one switch pair per one period of a corresponding one phase current is equal to the total of on durations for the low-side switching element of the corresponding one switch pair per one period of the corresponding one phase current. In other words, the control system 50 is configured to determine the waveform of each of the second drive signals gup2, gun2, gvp2, gvn2, gwp2, and gwn2 such that:

the total period of connection of the positive terminal Tp of the inverter IV to the motor-generator 10 is equal to that of connection of the negative terminal Th of the inverter IV to the motor-generator 10.

This achieves the second advantage of balancing the inverter output voltage in a positive direction and a negative direction per a corresponding one period of an electric angle of the inverter output voltage.

The control system 50 is configured such that the drive-signal waveform for each switch pair has an inverse symmetry about a point of a half-period of an electric angle of the drive signal waveform.

This achieves the third effect of making the inverter output voltage approximate with a sinusoidal voltage.

The control system 50 is configured such that the drive signal generator 38 selects one map with a preset drive-signal waveform based on the ratio of a magnitude of the norm Vn to the battery voltage VDC as the voltage utilization factor. This achieves the fourth advantage of determining the drive-signal waveform independently of the fluctuation in the battery voltage VDC.

The control system 50 is configured to store therein a plurality of the drive-signal waveforms that are associated with a plurality of prepared values of the voltage utilization factor that the inverter IV can provide, respectively. Each of the plurality of drive-signal waveforms is preset for each switch pair per one period of a corresponding one of the command voltages Vuc, Vvc, and Vwc.

Thus, the control system 50 easily selects one of the plurality of drive-signal waveforms; this selected one of the plurality of drive-signal waveforms corresponds to the calculated voltage utilization factor without computing any drive-signal waveform. This achieves the fifth advantage of properly determining one of the plurality of drive-signal waveforms with the computing load of the controller 14 being reduced.

The control system 50 is configured to make the phase δ advance when the estimated torque Te lacks relative to the request torque Td, and lag when the estimated torque Te becomes excessive relative to the request torque Td.

In addition, the control system 50 is configured to set the first norm Vn1 such that a partial differential of the torque T expressed in the equation [c4] as a function of the first norm Vn1 and the phase δ with respect to the phase δ becomes positive. This compensates the lack of the estimated torque Te, and reduces the excessive amount of the estimated torque Te. This achieves the sixth advantage of continuously carrying out the torque-feedback control even if the estimated torque Te lacks or become excessive with respect to the request torque Td.

The norm calculator 36a of the control system 50 sets the first norm Vn1 such that the d-axis current is equal to or lower than zero. This achieves the seventh advantage of preventing the controller 14 in the torque-feedback control mode from carrying out field-forcing control.

The norm calculator 36a of the control system 50 sets the first norm Vn1 such that the sign of the q-axis current is matched with the sign of the request torque Td. This achieves the eighth effect of determining the first norm Vn1 such that the first norm Vn1 meets the conditions similar to those used in the current-feedback control mode.

The norm calculator 36a of the control system 50 sets the first norm Vn1 to thereby most efficiently achieve a torque of the motor-generator 10 at any value of the armature current. This achieves the maximum torque control as the ninth advantage of the first embodiment.

The control system 50 is configured to set the first norm Vn1 using the map that outputs a value of the ω-normalized norm "Vn1/ω" when the request torque Td is inputted. This achieves the tenth advantage of easily setting the first norm Vn1.

The control system 50 is configured to carry out the torque-feedback control when the modulation factor is equal to or greater than the preset threshold α. This achieves the eleventh advantage of controlling the inverter IV in the current-feedback control mode as long as the performance of control of the inverter IV (the motor-generator 10) is maintained at a high level, thus reducing the designed processes to be carried out by the torque-feedback control unit 30, such as the drive signal generator 38.

The control system 50 is configured to, when the control mode for the inverter IV is switched from the current-feedback control mode to the torque-feedback control mode, set the initial value of the second norm Vn2 based on the command voltages vdc and vqc set by the current-feedback control unit 20. This achieves the twelfth advantage of maintaining continuity of the second norm Vn2 before and after of the control-mode switching.

The control system 50 is equipped with the PI control module 36b and the selector 36c. The PI control module 36b and the selector 36c allow the norm Vn set by the norm setter 36 to be gradually changed from the initial value of the second norm Vn2 based on the command voltages vdc and vqc to the first norm Vn1 calculated by the norm calculator 36a. This achieves the thirteenth advantage of preventing the norm Vn from being suddenly changed due to the control-mode switching.

The control system 50 is configured to, when the control mode for the inverter IV is switched from the torque-feedback control mode to the current-feedback control mode, set the initial values of the command voltages vdc and vqc for the current-feedback control unit 20 to the norm Vn and the phase δ set by the torque-feedback control unit 30. This achieves the fourteenth advantage of maintaining continuity of the inverter output voltage before and after the control-mode switching.

Second Embodiment

A control system according to the second embodiment of the present invention will be described hereinafter with reference to FIG. 7.

The structure of the control system according to the second embodiment is substantially identical to that of the control system 50 according to the first embodiment except for the following different points. So, like parts between the control systems according to the first and second embodiments, to which like reference characters are assigned, are omitted or simplified in description.

Figure 7:
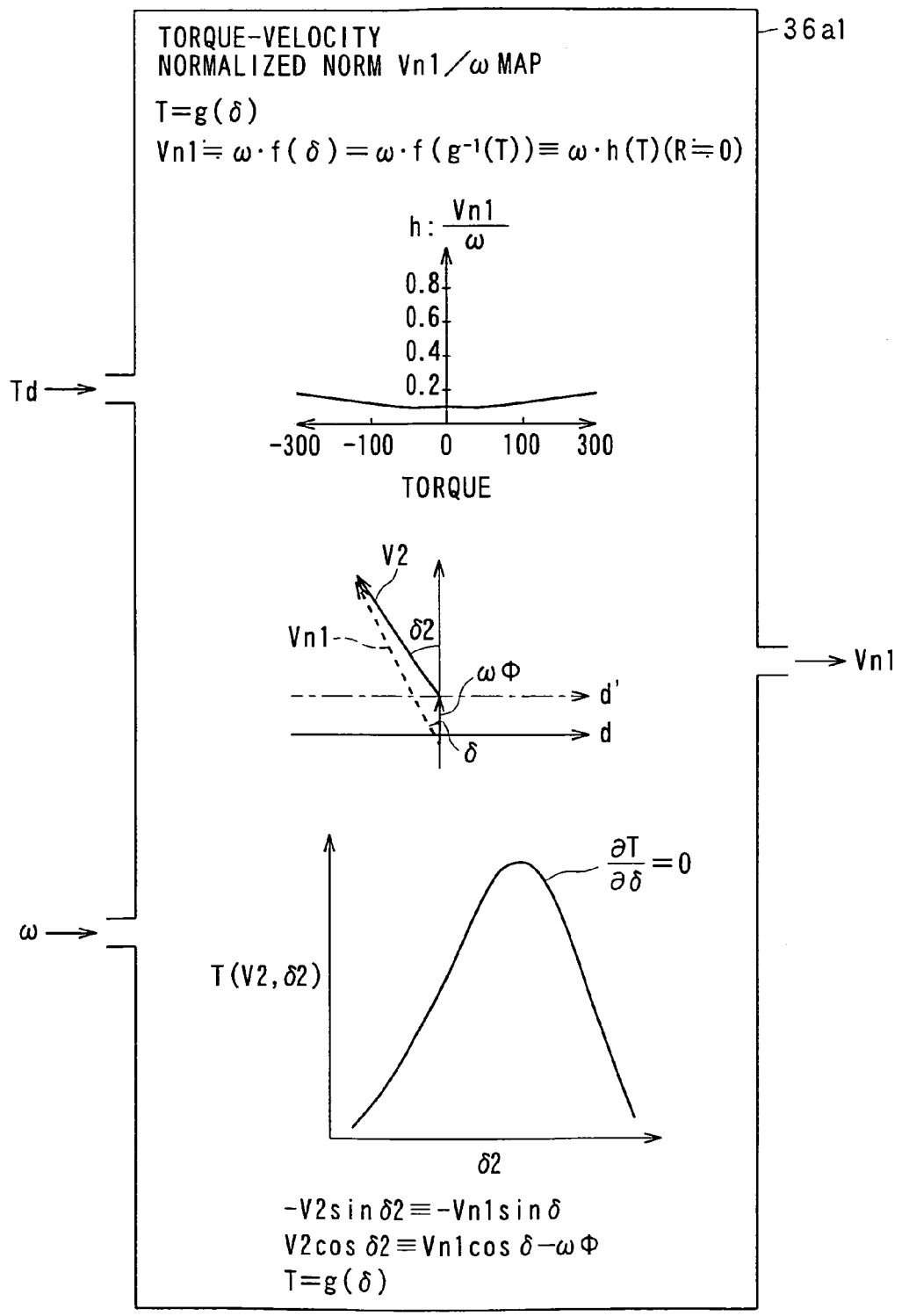
FIG. 7 is a block diagram schematically illustrating a functional structure of a norm calculator illustrated in FIG. 2 according to the second embodiment of the present invention.

FIG. 7 schematically illustrates an example of the functional structure of a norm calculator 36a1 according to the second embodiment.

Referring to FIG. 7, in the second embodiment, a norm V2 and a phase δ 2 of a voltage vector formed by subtracting a portion ωφ from the vector of the inverter output voltage are defined to represent the torque T, this portion ωφ is to be cancelled by an induced voltage in the motor-generator 10.

The norm calculator 36a1 is configured to set the first norm Vn1 such that a partial differential of the torque T with respect to the phase δ becomes zero.

Specifically, the torque T is represented by the following equation [c11]:

$$T(V2, \delta 2) = \frac{P\sqrt{R^2 + \omega^2 \cdot Ld^2}}{(R^2 + \omega^2 \cdot Ld \cdot Lq)^2} V2\sin(\delta 2 + \theta 1) \cdot \left\{\Phi(R^2 + \omega^2 \cdot Ld \cdot Lq) + (Ld - Lq)\sqrt{R^2 + \omega^2 Lq^2} \cos(\delta 2 + \theta 2)V2\right\}$$ [c11]

where $$Vd = -Vn1\sin\delta \equiv -V2\sin\delta 2$$

$$Vq - \omega\Phi = Vn1\cos\delta - \omega\Phi \equiv V2\cos\delta 2$$

In the equation [c11] replacement of the norm V2 and the phase δ 2 with the phase δ and the first norm Vn1 allows the first norm Vn1 to be represented as a function of the phase δ and the angular velocity ω. In particular, approximation of the armature resistance R to zero in the equation [c11] establishes the following equation [c12]:

$$Vn1 = \omega\Phi \cdot \frac{(2Lq - Ld)\cos\delta - \sqrt{4Lq(Lq - Ld)\sin^2\delta + Ld^2\cos^2\delta}}{2(Lq - Ld)\cos 2\delta}$$ [c12]

In the equation [c12], the ω-normalized norm "Vn1/ω" is represented as a function of the phase δ. This allows the ω-normalized norm to be defined as the function h of the torque T in the same manner as the first embodiment. In the second embodiment, the function h is calculated to be mapped and stored in the norm calculator 36a1 (see FIG. 7).

As described above, the control system according to the second embodiment achieves the following fifteenth advantage in addition to the first to eighth and tenth to fourteenth advantages.

Specifically, the control system according to the second embodiment is configured to select the first norm Vn1 such that an armature current based on the voltage vector formed by subtracting the portion ωφ from the vector of the inverter output voltage most efficiently generates a torque; this portion ωφ is to be cancelled by an induced voltage in the motor-generator 10. This achieves the fifteenth advantage of selecting the first norm Vn1 that reduces a q-axis component of the inverter output voltage; this q-axis component of the inverter output voltage contributes to the torque T of the motor-generator 10. According to the voltage equation [c2], the selected first norm Vn1 reduces the d- and q-axis components id and iq of the current vector as low as possible.

Third Embodiment

A control system according to the third embodiment of the present invention will be described hereinafter with reference to FIG. 8.

The structure of the control system according to the third embodiment is substantially identical to that of the control system 50 according to the first embodiment except for the following different points. So, like parts between the control systems according to the first and third embodiments, to which like reference characters are assigned, are omitted or simplified in description.

Figure 8:
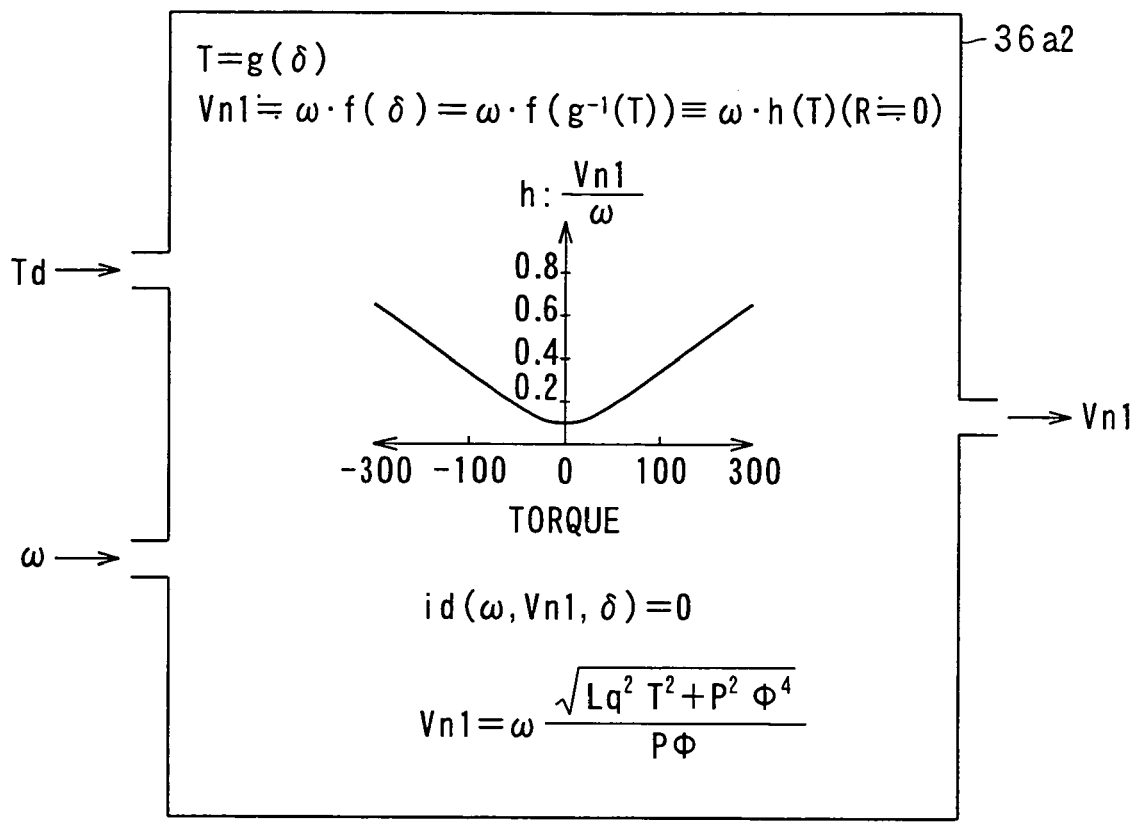
FIG. 8 is a block diagram schematically illustrating a functional structure of a norm calculator illustrated in FIG. 2 according to the third embodiment of the present invention.

FIG. 8 schematically illustrates an example of the functional structure of a norm calculator 36a2 of the controller 14 upon the power control system 50 operating in the power-running mode according to the third embodiment.

Referring to FIG. 8, in the third embodiment, the norm calculator 36a2 is configured to set the first norm Vn1 such that the d-axis current id becomes zero.

Specifically, the norm calculator 36a2 is configured to represent the first norm Vn1 as a function of the angular velocity ω and the phase δ in the equation [c3] on the condition that the d-axis current id represented as a function of the first norm Vn1 and the angular velocity ω is zero.

In addition, in the same manner as the first embodiment, conversion of the phase δ into the torque T allows a function h having the torque as an independent variable and the ω-normalized norm "Vn1/ω" as a dependent variable to be obtained.

Particularly, approximation of the armature resistance R to zero represents the function h having the torque as the independent variable and the ω-normalized norm "Vn1/ω" as the dependent variable defines the following equation [c13]:

$$Vn1 = \omega \cdot h(T) = \frac{\sqrt{Lq^2 T^2 + P^2 \Phi^4}}{P\Phi} \quad [c13]$$

Because the function [c13] is a simple equation, the function h is stored in the norm calculator 36a1 (see FIG. 8), which allows the norm calculator 36a2 to easily calculate the first norm Vn1.

As described above, the control system according to the third embodiment achieves the following sixteenth advantage in addition to the first to eighth and tenth to fourteenth advantages.

Specifically, the controller 14 according to the third embodiment is configured to set the first norm Vn1 such that the d-axis current id becomes zero. This achieves the sixteenth advantage of carrying out the toque-feedback control of the inverter IV without carrying out the field-force control and the field-weakening control.

Particularly, the first norm Vn1 is represented by the equation (c 131, making it easy to calculate the first norm Vn1. For this reason, it is possible to reduce, when the controller 14 is implemented in an Integrated Circuit (IC), the size of the IC.

Fourth Embodiment

Figure 9:
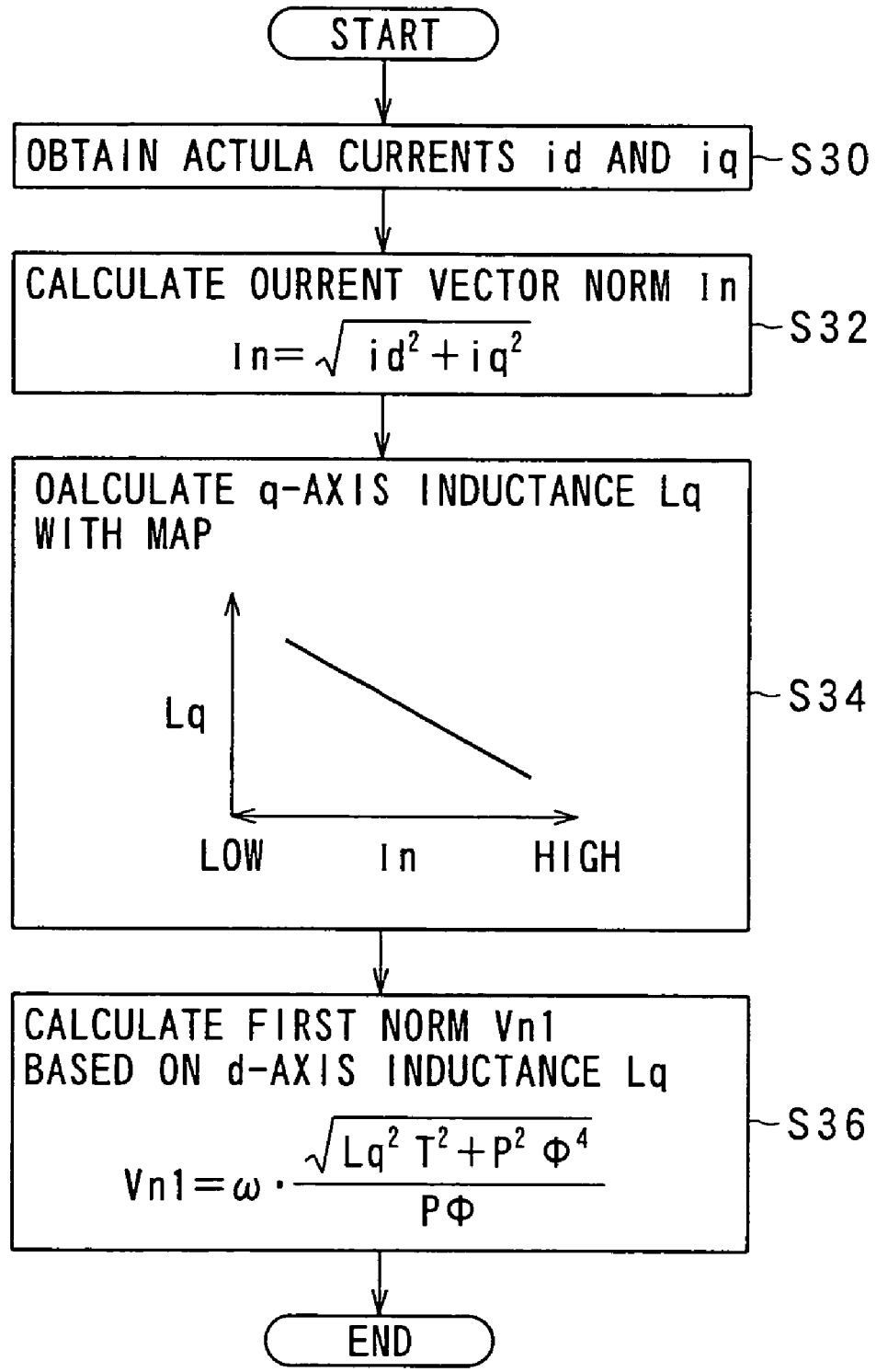
FIG. 9 is a flowchart schematically illustrating a routine to be executed by a norm calculator illustrated in FIG. 2 according to the fourth embodiment of the present invention.

A control system according to the fourth embodiment of the present invention will be described hereinafter with reference to FIG. 9.

The structure of the control system according to the fourth embodiment is substantially identical to that of the control system according to the third embodiment except for the following different points. So, like parts between the control systems according to the third and fourth embodiments, to which like reference characters are assigned, are omitted or simplified in description.

The control system according to the third embodiment is configured to calculate the first norm Vn1 using the equation [c13]. However, the q-axis inductance Lq widely varies depending on currents actually flowing in the motor-generator 10.

Thus, in the fourth embodiment, the control system is configured to variably determine the q-axis inductance Lq based on currents actually flowing in the motor-generator 10.

A routine to be executed by the norm calculator 36a2 will be described hereinafter with reference to FIG. 9. The routine is, for example, programmed in the controller 14 to be repeatedly executed thereby at a preset cycle.

Starting the routine, the norm calculator 36a2 receives the actual d-axis and q-axis current components id and iq in the d-q coordinate system from the two-phase converter 40 in step S30.

In step S32, the norm calculator 36a2 calculates a current-vector norm In by calculating the root sum square of the actual d-axis and q-axis current components id and iq.

Next, the norm calculator 36a2 uses a map to thereby calculate the q-axis inductance Lq in step S34. The map illustrated in FIG. 9 represents the relationship between a variable of the current vector norm In and a variable of the q-axis inductance Lq, and the map is stored beforehand in the norm calculator 36a2 in a table format or a program format.

The map is designed such that, the greater the current vector norm In is, the lower the q-axis inductance Lq is.

After calculation of the q-axis inductance Lq is completed, the norm calculator 36a2 calculates the first norm Vn1 based on the equation [c13] and the calculated q-axis inductance Lq.

As described above, the control system according to the fourth embodiment achieves the following seventeenth advantage in addition to the first to eighth, tenth to fourteenth, and sixteenth advantages.

Specifically, the controller 14 according to the fourth embodiment is configured to calculate the first norm Vn1 based on the actual d-axis and q-axis current components id and iq flowing in the motor-generator 10. This achieves the seventeenth advantage of calculating the first norm Vn1 at high accuracy even if the equation [c13] is used to calculate it.

Fifth Embodiment

Figure 10:
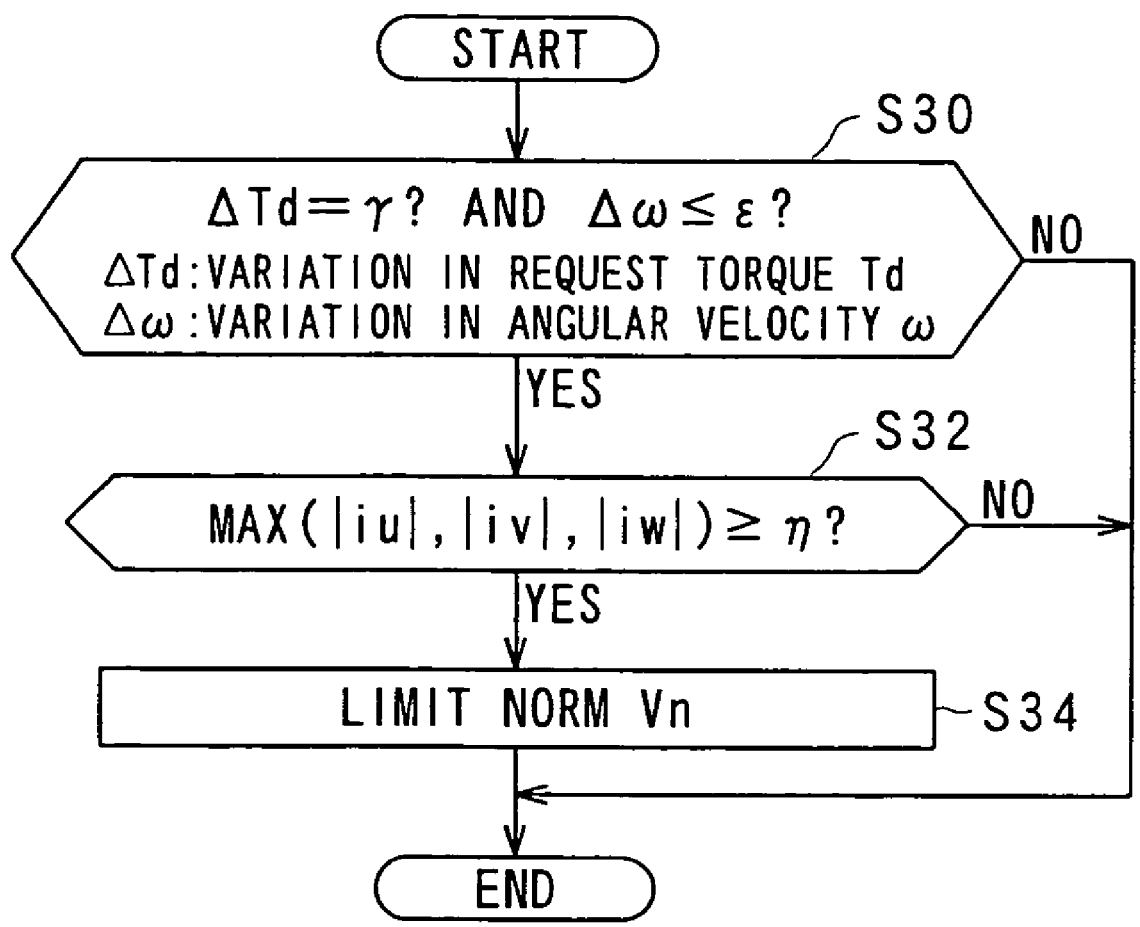
FIG. 10 is a flowchart schematically illustrating a current-limiting routine to be executed by the controller according to the fifth embodiment of the present invention.

A control system according to the fifth embodiment of the present invention will be described hereinafter with reference to FIG. 10.

The structure of the control system according to the fifth embodiment is substantially identical to that of the control system 50 according to the first embodiment except for the following different points. So, like parts between the control systems according to the first and fifth embodiments, to which like reference characters are assigned, are omitted or simplified in description.

The control system 50 according to the first embodiment is configured not to monitor the actual three-phase alternating currents iu, iv, and iw upon the inverter IV being controlled by the torque-feedback control unit 3. Thus, while the inverter IV is controlled by the torque-feedback control unit 3, when the rotational speed of the motor-generator 10 rapidly falls down, an induced voltage in the motor-generator 10 rapidly falls down. In this case, the three-phase alternating currents iu, iv, and iw may rapidly increase due to time lag caused before the norm setter 36 sets the norm Vn that reflects the reduction in the three-phase alternating currents iu, iv, and iw.

In order to address such a problem, the control system according to the fifth embodiment is configured to monitor the three-phase alternating currents iu, iv, and iw flowing through the respective U-, V-, and W-phase windings, and limit them when excessive three-phase currents flow therethrough.

Such a current limiting routine to be executed by the controller 14 will be described hereinafter with reference to FIG. 10. The current limiting routine is, for example, programmed in the controller 14 to be repeatedly executed thereby at a preset cycle.

Starting the current limiting routine, the controller 14 determines whether:

a variation $\Delta$ Td of the request torque Td between previously executed current limiting routine and the actual current limiting routine is equal to or lower than a preset variation $\gamma$; and a variation $\Delta$ $\omega$ of the angular velocity $\omega$ between previously executed current limiting routine and the actual current limiting routine is equal to or lower than a preset variation $\epsilon$ in step S40.

This operation in step S40 is to determine whether the three-phase currents flowing through the three-phase windings of the motor-generator are in a condition where they rapidly change.

Specifically, when the variation $\Delta$ Td of the request torque Td is small, the controller 14 determines that the change in the three-phase currents due to the variation in the torque is small. Similarly, when the variation $\Delta$ $\omega$ of the angular velocity $\omega$ is small, the controller 14 determines that the change in the three-phase currents due to the variation in the angular velocity is small.

For this reason, when the determination in step S40 is YES, that is, each of the variation $\Delta$ Td and the variation $\Delta\omega$ is equal to or lower than a corresponding one of the preset variations $\gamma$ and $\epsilon$, the controller 14 determines that the three-phase currents flowing through the three-phase windings of the motor-generator are in a condition where they do not rapidly change. Then, the controller 14 proceeds to step S42.

Otherwise, when the determination in step S40 is NO, the controller 14 terminates the current limiting routine.

In step S42, the controller 14 determines whether an absolute value of a maximum one value in all of the three-phase currents iu, iv, and iw flowing in the motor-generator 10 is equal to or greater than a preset threshold value $\eta$. In FIG. 10, a function MAX (a, b, c) is defined to output a maximum one in all of a, b, and c.

The operation in step S42 is to determine whether the three-phase currents iu, iv, and iw are in a condition where they rapidly increase. Specifically, when the determination is affirmative in step S40, the controller 14 determines that the three-phase currents flowing through the three-phase windings of the motor-generator are in a condition where they do not rapidly change.

However, irrespective of the affirmative determination in step S40, when the absolute value of the maximum one in all of the three-phase currents iu, iv, and iw is equal to or greater than the preset threshold value $\eta$, the controller 14 estimates that an actual angular velocity of the motor-generator 10 greatly falls down relative to the actually measured angular velocity. Note that the threshold value $\eta$ can be set to a value lower than a maximum permissible current in the motor-generator 10 by a preset margin.

Upon determining that the absolute value of the maximum one in all of the three-phase currents iu, iv, and iw is equal to or greater than the preset threshold value $\eta$ (YES in step S42), the controller 14 proceeds to step S44.

In step S44, the controller 14 limits the norm Vn to be set by the norm setter 36. Specifically, the controller 14 sets the first norm Vn1 outputted from the norm calculator 36a as the norm Vn.

In place of the operation in step S44, the controller 14 can generate the second drive signals gup2, gun2, gvp2, gvn2, gwp2, and gwn2 each with a corresponding drive-signal waveform corresponding to a lower limit of the voltage utilization factor.

In place of the operation in step S44, the controller 14 can store therein a prepared failsafe norm Vn' or a prepared failsafe drive-signal waveform for each of the second drive signals. Thus, the controller 14 can set the prepared failsafe norm Vn' as the norm Vn, or generate the second drive signals gup2, gun2, gvp2, gvn2, gwp2, and gwn2 each with the prepared failsafe drive-signal waveform.

When the operation in step S44 is completed, or the determination in step S42 is negative (NO), the controller 14 terminates the current limiting routine.

As described above, the controller 14 according to the fifth embodiment achieves the following eighteenth advantage in addition to the first to fourteenth advantages.

Specifically, the controller 14 according to the fifth embodiment is configured to limit the norm Vn only when the absolute value of the maximum one in all of the three-phase currents iu, iv, and iw is equal to or greater than the preset threshold value $\eta$ irrespective of each of the variation $\Delta$ Td and the variation $\Delta$ $\omega$ being equal to or lower than a corresponding one of the preset variations $\gamma$ and $\epsilon$. This achieves the eighteenth advantage of rapidly addressing a condition where an excessive current likely flows in the motor-generator 10 due to sudden reduction in an induced voltage in the motor-generator 10 before sudden change in the angular velocity $\omega$ is measured.

The first to fifth embodiments and their modifications can be changed and/or modified within the scope of the present invention.

The different points according to the fifth embodiment can be applied to at least one of the second to fourth embodiments.

Means installed in the norm setter 36 and configured to gradually change the norm Vn from the initial value based on the d- and q-axis command voltages vdc and vqc to the first norm Vn1 calculated by the norm calculator 36a is not limited to the structure described in the first embodiment. For example, the norm setter 36 can be configured to calculate a weighted average of the initial value based on the d- and q-axis command voltages vdc and vqc and the output of the norm calculator 36a.

The drive signal generator 38 can calculate, using a PWM process, each of the second drive signals gup2, gun2, gvp2, gvn2, gwp2, and gwn2 based on the norm Vn for each of the voltage utilization factors.

The drive signal generator 38 can retrieve any one map (drive-signal waveform) in the plurality of maps M based on only the norm Vn as a parameter when the inverter input voltage is taken to be constant.

Each of the drive-signal waveforms to be generated by the drive-signal generator 38 has an inverse symmetry about a point of an electric angle of $\pi$ radians (180 degrees) within one electric angle of $2\pi$ radians, but the present invention is not limited to such a symmetric drive signal.

Specifically, the drive-signal generator 38 can generate the second drive signals gup2, gun2, gvp2, gvn2, gwp2, and gwn2 based on the phase and the norm Vn of the output-voltage vector. For example, the drive-signal generator 38 can generate at least one of the second drive signals gup2, gun2, gvp2, gvn2, gwp2, and gwn2 based on the phase δ and the norm Vn of the output-voltage vector even if it is difficult for the current-feedback control unit 20 to set the at least one of the second drive signals.

In each of the first to fifth embodiments and their modifications, the phase δ can be set based on a proportional-integral-derivative feedback algorithm in place of the proportional integral feedback algorithm for the deviation Δ of the request torque Td from the estimated torque Te.

In each of the first to fifth embodiments and their modifications, the current-feedback control module 20 can calculate the command voltages vdc and vqc based on the output of each of the feedback control modules 24 and 25 without using the non-interacting control module 26.

In each of the first to fifth embodiments and their modifications, each of the feedback control modules 24 and 25 can carry out a proportional-integral-derivative feedback algorithm in place of the proportional integral feedback algorithm.

In each of the first to fifth embodiments and their modifications, the current-feedback control unit 20 is configured to carry out PWM control, but can carry out another current control, such as instantaneous current control. The instantaneous current control is, for example, designed to use hysteresis comparators to directly adjust the instantaneous phase current Iu for the U-phase winding, the instantaneous phase current Iv for the V-phase winding, and the instantaneous phase current Iw for the W-phase winding.

The actual rotational angle θ and/or angular velocity ω can be estimated based on, for example, actual d-axis and q-axis currents without using the rotational angle sensor 15.

In each of the first to fifth embodiments and their modifications, as the salient-pole rotary machine, an IPMSM is used, but another type of salient-pole rotary machines, such as a Synchronous Reluctance Motor, can be used.

In each of the first to fifth embodiments and their modifications, a salient-pole motor is used, but a non salient-pole rotary machine can be used. When the non salient-pole rotary machine is designed such that the first norm Vn and the phase δ have one-to-one correspondence with each other, the second drive signals can be calculated based on the first norm Vn1; this first norm Vn1 meets a partial differential of the torque T with respect to the first norm Vn1 is zero.

Various types of rotary machines according to the present invention can be installed in various types of vehicle, such as an electric automobile. Various types of rotary machines to which the present invention can be applied are not limited to a component of a drive system of vehicles.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. An apparatus for driving a switching member of a power converter so as to generate, from a voltage of a power supply source, a variable output voltage of the power converter, the output voltage being applied to a rotary machine and generating torque in the rotary machine for rotating a rotor, the apparatus comprising:

a waveform setter that sets a waveform of the output voltage of the power converter based on any one of: at least two of a request torque for the rotary machine, a rotational velocity of the rotor, a command voltage for controlling the torque in the rotary machine to the request torque, and the voltage of the power source; and a voltage utilization factor of the power converter;

a phase setter that sets, based on any one of: a deviation between the generated torque and the request torque; and a deviation between a command current for the rotary machine defined by the request torque and an actual current flowing in the rotary machine, a phase of the output voltage of the power converter in the two-phase rotating coordinate system; and a drive signal determiner that determines, based on the waveform of the output voltage by the waveform setter and the phase set by the phase setter, a drive signal, and applies the drive signal to the switching member to thereby drive the switching member such that the generated torque is adjusted to the request torque.

2. The apparatus according to claim 1, wherein the waveform setter comprises a storage unit that stores therein a drive pattern of the switching element, the drive pattern corresponding to the waveform of the output voltage.

3. The apparatus according to claim 2, wherein the drive pattern of the switching element is provided in plurality, and the waveform setter is configured to select one of the plurality of drive patterns according to the request torque and the rotational velocity of the rotor.

4. The apparatus according to claim 2, wherein the drive pattern of the switching element is provided in plurality, and the waveform setter is configured to select one of the plurality of drive patterns according to the request torque, the rotational velocity of the rotor, and the voltage of the power source.

5. The apparatus according to claim 2, wherein the drive pattern of the switching element is provided in plurality, and the waveform setter is configured to select one of the plurality of drive patterns according to the voltage of the power source and the command voltage.

6. The apparatus according to claim 2, wherein the drive pattern of the switching element is provided in plurality, and the waveform setter is configured to select one of the plurality of drive patterns according to the voltage utilization factor.

7. The apparatus according to claim 1, wherein the rotor has a magnetic field, and the two-phase rotating coordinate system is a d-q coordinate system having a d-axis and a q-axis, the d-axis representing a direction of the magnetic field of the rotor, the q-axis having a phase that leads with respect to the d-axis by an electric angle of $\pi/2$ radians during rotation of the rotor, and the waveform setter is configured to set the waveform of the output voltage to be applied to the rotary machine such that a current flowing in the rotary machine in the d-axis based on the output voltage is equal to or lower zero.

8. The apparatus according to claim 1, wherein the rotor has a magnetic field, and the two-phase rotating coordinate system is a d-q coordinate system having a d-axis and a q-axis, the d-axis representing a direction of the magnetic field of the rotor, the q-axis having a phase that leads with respect to the d-axis by an electric angle of $\pi/2$ radians during rotation of the rotor, and the waveform setter is configured to set the waveform of the output voltage to be applied to the rotary machine such that a sign of a current flowing in the rotary machine in the q-axis based on the output voltage is matched with a sign of the request torque.

9. The apparatus according to claim 1, wherein the waveform setter is configured to set the waveform of the output voltage to thereby most efficiently generate the torque in the rotary machine at any value of an armature current flowing in the armature of the rotary machine based on the output voltage.

10. The apparatus according to claim 1, wherein the phase setter is configured to set the phase of the output voltage of the power converter based on the deviation between the generated torque and the request torque.

11. The apparatus according to claim 1, wherein the phase setter is configured to set the phase of the output voltage of the power converter based on the deviation between the deviation between the command current and the actual current.

12. The apparatus according to claim 1, wherein the drive signal determiner is configured to apply the drive signal to the switching member when the voltage utilization factor of the power converter is equal to or greater than a preset value.

13. The apparatus according to claim 12, further comprising:
a current feedback control unit configured to, when the voltage utilization factor is lower than the preset value, determine a current-feedback drive signal based on the actual current flowing in the rotary machine, and applies the current-feedback drive signal to the switching member as the drive signal to thereby drive the switching member such that the actual current flowing in the rotary machine is adjusted to the command current.

14. The apparatus according to claim 13, wherein the current feedback control unit comprises a command voltage calculator configured to calculate a value of the command voltage as a parameter to be used for the determination of the current feedback drive signal, and
the waveform setter is configured to set an initial value based on the value of the command voltage calculated by the command voltage calculator when the drive for the switching member of the power converter is switched from the current feedback control unit to the drive signal determiner.

15. The apparatus according to claim 14, wherein the waveform setter comprises:
a waveform calculator configured to calculate a waveform of the output signal based on the phase set by the phase setter and the rotational velocity of the rotor; and
a changing unit configured to gradually change the waveform of the output voltage from the initial value to the calculated waveform of the output voltage by the waveform calculator.

16. The apparatus according to claim 13, wherein the current feedback control unit comprises:
a command voltage calculator configured to calculate a value of the command voltage as a parameter to be used for the determination of the current feedback drive signal, and
an initial value setter configured to set an initial value of the command voltage to be calculated by the command voltage calculator based on the waveform of the output voltage set by the waveform setter and the phase set by the phase setter when the drive for the switching member of the power converter is switched from the drive signal setter to the current feedback control unit.

17. The apparatus according to claim 1, further comprising:
a limiting unit configured to limit the waveform of the output voltage to be applied to the rotary machine when the actual current flowing in the rotary machine based on the output voltage of the power converter with the switching member being driven by the drive signal is equal to or greater than a threshold value although a variation in the rotational velocity of the rotor is equal to or lower than a first preset value and a variation in the request torque is equal to or lower than a second preset value.

18. A control system comprising:
a power converter; and
an apparatus for driving a switching member of the power converter so as to generate, from a voltage of a power supply source, a variable output voltage of the power converter, the output voltage being applied to a rotary machine and generating torque in the rotary machine for rotating a rotor, the apparatus comprising:
a waveform setter that sets a waveform of the output voltage of the power converter based on any one of: at least two of a request torque for the rotary machine, a rotational velocity of the rotor, a command voltage for controlling the torque in the rotary machine to the request torque, and the voltage of the power source; and a voltage utilization factor of the power converter;
a phase setter that sets, based on any one of: a deviation between the generated torque and the request torque; and a deviation between a command current for the rotary machine defined by the request torque and an actual current flowing in the rotary machine, a phase of the output voltage of the power converter in the two-phase rotating coordinate system; and
a drive signal determiner that determines, based on the waveform of the output voltage by the waveform setter and the phase set by the phase setter, a drive signal, and applies the drive signal to the switching member to thereby drive the switching member such that the generated torque is adjusted to the request torque.

* * * * *